(12) United States Patent
Atungsiri et al.

(10) Patent No.: US 9,112,760 B2
(45) Date of Patent: Aug. 18, 2015

(54) TRANSMITTER AND TRANSMITTING METHOD FOR TRANSMITTING DATA VIA OFDM SYMBOLS IN WHICH THE DATA IS PROVIDED FROM A PLURALITY OF DIFFERENT DATA PIPES

(71) Applicant: Sony Corporation, Tokyo (JP)

(72) Inventors: Samuel Asangbeng Atungsiri, Basingstoke (GB); Matthew Paul Athol Taylor, Ringwood (GB); Obioma Chiedozie Donald Okehie, Redhill (GB)

(73) Assignee: Sony Corporation, Tokyo (JP)

( * ) Notice: Subject to any disclaimer, the term of this patent is extended or adjusted under 35 U.S.C. 154(b) by 147 days.

(21) Appl. No.: 13/747,531

(22) Filed: Jan. 23, 2013

(65) Prior Publication Data
US 2013/0170535 A1 Jul. 4, 2013

Related U.S. Application Data

(63) Continuation-in-part of application No. PCT/GB2011/051964, filed on Oct. 12, 2011, which is
(Continued)

(30) Foreign Application Priority Data

| Oct. 18, 2010 | (GB) | 107566.9 |
| Oct. 18, 2010 | (GB) | 107657.7 |
| Oct. 18, 2010 | (GB) | 1017565.1 |
| Jan. 17, 2011 | (GB) | 110736.6 |

(51) Int. Cl.
*H03H 7/30* (2006.01)
*H04L 27/26* (2006.01)
*H04L 27/34* (2006.01)

(52) U.S. Cl.
CPC ........ *H04L 27/2649* (2013.01); *H04L 27/2627* (2013.01); *H04L 27/3488* (2013.01)

(58) Field of Classification Search
CPC .................................................. H04L 1/0006

USPC .......................................................... 375/229
See application file for complete search history.

(56) References Cited

U.S. PATENT DOCUMENTS

2002/0013948 A1\* 1/2002 Aguayo et al. .................. 725/91
2004/0128605 A1\* 7/2004 Sibecas et al. ................ 714/746
(Continued)

FOREIGN PATENT DOCUMENTS

| EP | 1 648 128 A2 | 4/2006 |
| EP | 1 742 215 A1 | 1/2007 |

(Continued)

OTHER PUBLICATIONS

International Search Repot mailed Dec. 27, 2011, in PCT/GB2011/051964.

(Continued)

*Primary Examiner* — Lihong Yu
(74) *Attorney, Agent, or Firm* — Oblon, McClelland, Maier & Neustadt, L.L.P.

(57) ABSTRACT

A receiver recovers local service data symbols from first Orthogonal Frequency Division Multiplexed (OFDM) symbols in the presence of second OFDM symbols. The second OFDM symbols carry national broadcast data symbols and modulated on to the sub-carriers of the second OFDM symbols using a first modulation scheme. The first OFDM symbols carry the national broadcast data symbols and the local service data symbols from a local insertion pipe and modulated on to the sub-carriers of the first OFDM symbols using a second modulation scheme. The receiver comprises an OFDM detector which includes an equalizer to recover local service modulated sub-carriers of the second modulation scheme.

8 Claims, 28 Drawing Sheets

(56) References Cited

Related U.S. Application Data a continuation-in-part of application No. PCT/GB2011/051843, filed on Sep. 29, 2011, which is a continuation-in-part of application No. PCT/GB2011/051777, filed on Sep. 21, 2011.

U.S. PATENT DOCUMENTS

| | | |
|---|---|---|
| 2005/0169400 A1 | 8/2005 | Chouly et al. |
| 2006/0013120 A1 | 1/2006 | Jiang |
| 2006/0178755 A1 | 8/2006 | Ling et al. |
| 2007/0049199 A1 | 3/2007 | Lim et al. |
| 2008/0049598 A1 | 2/2008 | Ma et al. |
| 2008/0159186 A1* | 7/2008 | Steer .......................... 370/297 |
| 2010/0142644 A1 | 6/2010 | Jiang et al. |
| 2012/0314786 A1 | 12/2012 | Atungsiri et al. |

FOREIGN PATENT DOCUMENTS

| | | |
|---|---|---|
| KR | 10-2008-0112063 | 12/2008 |
| WO | WO 2011/104536 A2 | 9/2011 |

OTHER PUBLICATIONS

International Search Report mailed Dec. 20, 2011, in PCT/GB2011/051777.
International Search Report mailed Dec. 14, 2011, in PCT/GB2011/051843.
United Kingdom Search Report GB1017565.1 dated Feb. 17, 2011.
United Kingdom Search Report GB1100736.6 dated Jun. 22, 2011.
United Kingdom Search Report GB1017567.7 dated Feb. 17, 2011.

* cited by examiner

TRANSMITTER AND TRANSMITTING METHOD FOR TRANSMITTING DATA VIA OFDM SYMBOLS IN WHICH THE DATA IS PROVIDED FROM A PLURALITY OF DIFFERENT DATA PIPES

CROSS-REFERENCE TO RELATED APPLICATIONS

The present application is a continuation-in-part of International Application No. PCT/GB2011/051964 filed Oct. 12, 2011, which claims foreign priority to application nos. GB 107566.9 and GB 110736.6 filed Oct. 18, 2010 and Jan. 17, 2011, respectively. The present application is also a continuation-in-part of International Application No. PCT/GB2011/051843 filed Sep. 29, 2011, which claims foreign priority to application no. GB1017565.1 filed Oct. 18, 2010, and a continuation-in-part of International Application No. PCT/GB2011/051777 filed Sep. 21, 2011, which claims foreign priority to application no. GB 107567.7 filed Oct. 18, 2010. The content of each of the foregoing applications is hereby incorporated by reference into the present application in its entirety.

FIELD OF INVENTION

The present invention relates to receivers for receiving data via Orthogonal Frequency Division Multiplexed (OFDM) symbols in which the data is provided from a plurality of different data pipes. The present invention also relates to transmitters for transmitting data via Orthogonal Frequency Division Multiplexed (OFDM) symbols in which the data is provided from a plurality of different data pipes.

Embodiments of the present invention find application in receiving data communicated using OFDM symbols which are transmitted using communication systems which comprise a plurality of base stations disposed throughout a geographical area. In some embodiments the communication system is arranged to broadcast video, audio or data.

BACKGROUND OF THE INVENTION

Orthogonal Frequency Division Multiplexing (OFDM) is a modulation technique which has found much favour in communication systems, such as for example those designed to operate in accordance with the first and second generation Digital Video Broadcasting terrestrial standards (DVB-T/T2) and is also being proposed for fourth generation mobile communication systems which are also known as Long Term Evolution (LTE). OFDM can be generally described as providing K narrow band sub-carriers (where K is an integer) which are modulated in parallel, each sub-carrier communicating a modulated data symbol such as Quadrature Amplitude Modulated (QAM) modulation symbol or Quaternary Phase-shift Keying (QPSK) modulation symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than the coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with a different modulation symbol.

In the Next Generation for Hand held (NGH) television system it has been proposed to use OFDM to transmit television signals from base stations disposed throughout a geographical area. In some examples the NGH system will form a network in which a plurality of base stations communicate OFDM symbols contemporaneously on the same carrier frequency thereby forming a so-called single frequency network. As a result of some of the properties of OFDM, a receiver may receive the OFDM signals from two or more different base stations which can then be combined in the receiver to improve the integrity of the communicated data.

Whilst a single frequency network has advantages in terms of operation and improved integrity of the communicated data, it also suffers a disadvantage if data local to a part of the geographical area is required to be communicated. For example, it is well known in the United Kingdom that the national carrier, the BBC, broadcasts television news throughout the entire national network but then switches, at certain times, to "local news" in which a local news programme is transmitted which is specifically related to a local area within the national network. However, the United Kingdom operates a multi-frequency DVB-T system so that the insertion of local news or local content of any sort is a trivial matter because the different regions transmit DVB-T television signals on different frequencies and so television receivers simply tune to an appropriate carrier frequency for the region without interference from other regions. However, providing an arrangement to insert data locally in a single frequency network presents a technical problem.

A known technique for providing a hierarchical or multi-layer modulation scheme in a single frequency OFDM network is disclosed in US 2008/0159186. The hierarchical modulation scheme provides a plurality of modulation layers which can be used to communicate data from different data sources or pipes contemporaneously.

SUMMARY OF INVENTION

According to the present invention there is provided a receiver for receiving and recovering local service data symbols from first Orthogonal Frequency Division Multiplexed (OFDM) symbols in the presence of second OFDM symbols. The first and the second OFDM symbols include a plurality of sub-carrier symbols formed in the frequency domain, the second OFDM symbols carrying national broadcast data symbols and modulated on to the sub-carriers of the second OFDM symbols using a first modulation scheme to form national broadcast modulation symbols, and the first OFDM symbols carrying the national broadcast data symbols and the local service data symbols and modulated on to the sub-carriers of the first OFDM symbols using a second modulation scheme. The first and the second OFDM symbols both include the same pilot sub-carrier symbols and the first OFDM symbols include local pilot symbols. The receiver comprises a tuner which is arranged in operation to detect a radio frequency signal representing a combination of the first and the second OFDM symbols and to form a received base band signal representing the combined first and second OFDM symbols, an OFDM detector which is arranged in operation to recover modulation symbols carrying the local service data symbols from the data bearing sub-carriers of the first OFDM symbols, and a de-modulator arranged in operation to generate an estimate of the local service data symbols from the modulation symbols carrying the local service data symbols. The OFDM detector includes an equaliser for recovering the local service data symbols of the second modulation scheme by generating an estimate of a combined channel ($[H_n(z)+H_l(z)]$) via which the first and second OFDM symbols have passed using the pilot sub-carrier symbols of the first and second OFDM symbols;

generating an estimate of the national broadcast modulation symbols from the modulated data bearing sub-carriers of the first modulation scheme from the second OFDM symbols ($\hat{S}(z)$);

generating an estimate of a convolution of the combined channel and the national broadcast modulation symbols ($\hat{S}(z)$ $[H_n(z)+H_l(z)]$);

generating an estimate of a component of the received base band signal representing the local service modulation symbols of the first OFDM symbols by subtracting from the received signal the generated estimate of the national broadcast modulation symbols convolved with the estimate of the combined channel to form an intermediate result ($D(z)H_l(z) \approx R(z)-\hat{S}(z)[H_n(z)+H_l(z)]$);

generating an estimate of a channel via which the first OFDM symbols were received using the local pilot symbols ($\hat{H}_l(z)$); and generating an estimate of local service data symbols from a combination of the estimate of the component of the received signal representing the modulation symbols carrying the local service data and the estimate of the channel via which the first OFDM symbols were received $$\left(\tilde{D}(z) \approx \frac{R(z)-\hat{S}(z)[H_n(z)+H_l(z)]}{\hat{H}_l(z)}\right).$$

According to the arrangement disclosed in US 2008/0159186 published 3 Jul. 2008, a single carrier frequency OFDM network is provided with a facility for communicating data from different pipes contemporaneously by using two related modulations schemes to form a plurality of different modulation "layers". As will be explained shortly, a first modulation scheme is selected for communicating data from a first data pipe and a second modulation scheme related to the first modulation scheme is selected for communicating data according to the first and a second communications pipes. The second modulation scheme comprises an increased number of constellation points in the complex plane than the first modulation scheme. The data from the first pipe maybe from a national broadcast, whereas the data from the second pipe is from a local broadcast signal, which is directed to an area which is a subset of the area of the national broadcast signal.

According to example embodiments of the present invention, a receiver is arranged to recover data symbols according to the local service using an equaliser, which can compute an estimate of the local service modulation symbols from OFDM symbols which are carrying both the local service and the national broadcast service carried using data sub-carriers modulated with the second modulation scheme in the presence of OFDM symbols which are only carrying the national broadcast data symbols modulated with the first modulation scheme. This is achieved by making a first coarse estimate of the first modulation symbols and then convolving this estimate with an estimate of the channel through which the first and second OFDM symbols have passed. The estimate of the channel is made using the pilot sub-carriers as these coincide in the first and the second OFDM symbols. Subtracting the result of the convolution from the received signal and dividing by the estimate of the channel through which only the second OFDM symbol has passed provides an estimate of the modulation symbols according to the second modulation scheme, which are carrying the local service data symbols. The channel through which only the second OFDM symbol has passed can be estimated using the local service insertion pilots carried on known sub-carriers of the second OFDM symbol.

The receiver can be therefore arranged to detect and recover data from OFDM symbols communicated by a communication system which is arranged such that one or more base stations from a plurality of base stations which form a communications network are selected to transmit local content via OFDM symbols which have sub-carriers modulated in accordance with the second modulation scheme. This is because the first modulation scheme forms a sub-set of constellation points in the complex plane of the second modulation scheme, which can be thought of as a more coarse version of the second modulation scheme, so that differentiation between constellation points of the first modulation symbols in the complex plane allows the data from the national broadcast signal to be more easily recovered. Furthermore, because other base stations may not be communicating the local insertion pipe data, the receiver, within the geographical area in which these other base stations are disposed, will still be able to detect the data from the national broadcast signal. Accordingly, an effective and efficient way of inserting local content in a single frequency network is provided.

In some examples the OFDM detector includes an equaliser which is arranged in operation to generate the estimate of the local service data symbols from the combination of the estimate of the component of the received base band signal representing the modulation symbols carrying the local service data symbols and the estimate of the channel via which the first OFDM symbols were received by dividing the estimate of the component of the received signal representing the local service data symbols by the estimate of the local channel. An estimate of each of the modulation symbols carrying the local service data symbols from the first OFDM symbol is thereby recovered, and by de-mapping the modulation symbols carrying the local service data symbols the estimate of the local service data symbols is generated. However, whilst this provides a simple and effective equalisation technique for at least reducing or cancelling the effects of the channel, in a multi-path fading channel, frequency nulls can be produced in the channel, which can result in noise amplification or cause a modulation symbol to produce an amplified value which is equal to a maximum possible real and imaginary sample components, thereby losing data which such modulation symbols carry.

In other examples, the equaliser includes a local service equaliser/demapper which is arranged in operation to generate the estimate of the local service data symbols from the combination of the estimate of the component of the received base band signal representing the modulation symbols carrying the local service modulation symbols and the estimate of the channel via which the first OFDM symbols were received. This is achieved by calculating a log likelihood ratio for each of the local service data symbols from the estimate of the component of the received signal representing the modulation symbols carrying the local service data symbols and the estimate of the local channel, and estimating the local service data symbols from the log likelihood ratio calculations. As such, by using a log likelihood ratio calculation for detecting the local service data symbols from the first OFDM symbols and the estimate of the local service channel, no division by the channel occurs in the frequency domain. Accordingly, the local service data symbols as well as the national broadcast data symbols can be recovered in a multi-path fading channel.

Correspondingly in other example embodiments the OFDM detector also includes an equaliser/demapper, which calculates a log likelihood ratio for the national broadcast data symbols from the components of the first and second OFDM representing the national broadcast data symbols and the combined channel estimate through which the symbols were received.

In some examples, the equaliser can be arranged to re-generate an estimate of the national broadcast modulation symbols, by re-generating an estimate of the component of the received base band signal representing modulation symbols of the first OFDM symbol carrying local service data symbols by combining the estimate of the modulation symbols representing the local service data symbols with the channel via which the first OFDM symbols were received, generating an estimate of a component of the received base band signal representing the national broadcast modulation symbols by subtracting the re-generated estimate of the component of the received base band signal representing the modulation symbols carrying the local service data symbols from the received base band signal, and dividing by the combined channel. Furthermore, the re-generated estimate of the national broadcast modulation symbols may be used to make a refined estimate of the local service modulation symbols. The equaliser can therefore be arranged to generate a refined estimate of the local service data symbols from the local service modulation symbols. Thus in a form of turbo detection, the re-generated estimate of the national broadcast modulation symbols can be used to generate a further refined estimate of the local service modulation symbols and the process of detection further repeated to generate further refined estimates.

According to the present invention there is provided a transmitter for communicating data using Orthogonal Frequency Division Multiplexed (OFDM) symbols, the OFDM symbols including a plurality of sub-carrier symbols formed in the frequency domain for modulating with the data to be carried and pilot sub-carriers. The transmitter includes a modulator arranged in operation to receive on a first input, national broadcast data symbols from a first data pipe according to a national broadcast channel for transmission, to receive on a second input, local service data symbols from a local service insertion data pipe according to a local service channel for transmission, and to modulate the data bearing sub-carrier signals of the OFDM symbols with either the national broadcast data symbols or the local service data symbols and the national broadcast symbols. The modulation of the data bearing sub-carrier signals of the OFDM symbols with the national broadcast data symbols is performed by mapping the data symbols according to a first modulation scheme, and the modulation of the sub-carrier signals of the OFDM symbols with the local service data symbols and the national broadcast data symbols is performed by mapping the national broadcast data symbols and the local service data symbols according to a second modulation scheme. The modulator modulates the pilot sub-carriers of the OFDM symbols with pilot symbols to form the OFDM symbols for transmission. The first modulation scheme is a lower order modulation scheme providing first modulation symbols with values from a smaller number of constellation points in the complex plane than the second modulation scheme which is a higher order modulation scheme, the second modulation scheme providing second modulation symbols with values which are disposed in the complex plane about corresponding values of the first modulation scheme, with the effect that detection of one of the second modulation symbols of the second modulation scheme will provide the local insertion data symbols and the national broadcast data symbols and allow detection of national broadcast modulation symbols from the first modulation scheme providing the national broadcast data symbols, in the presence of modulation symbols from the second modulation scheme. If the modulator is arranged to modulate the data bearing sub-carriers with both the local service data symbols and the national broadcast symbols, to include local pilot symbols with the local service data symbols.

Embodiments of the present invention are arranged to include local pilot symbols which with local service data symbols when communicated with national broadcast data symbols which are communicated using modulation symbols of a second modulation scheme whereas when transmitting the national broadcasting data symbols alone a first modulation scheme is used, which is related to the second modulation scheme in a hierarchical manner. The local pilot symbols can be used by a receiver to estimate a channel via which the local service modulation symbols have passed, which can allow the local service data symbols modulated using the second modulation scheme to be detected in the presence of OFDM symbols modulated with the first modulation scheme. For example, a receiver can be arranged to recover data symbols according to the local service using an equaliser, which can estimate the local service modulation symbols from OFDM symbols which are carrying both the local service and the national broadcast service carried using data sub-carriers modulated with the second modulation scheme in the presence of OFDM symbols which are only carrying the national broadcast data symbols modulated with the first modulation scheme. This is achieved by making a first coarse estimate of the first modulation symbols and then convolving this estimate with the channel estimate using the pilot sub-carriers. Subtracting the result from the received signal and dividing by an estimate of the channel of the first OFDM symbols provides an estimate of the local service modulation symbols according to the second modulation scheme.

The receiver can be therefore arranged to detect and recover data from OFDM symbols communicated by a communication system which is arranged such that one or more base stations from a plurality of base stations which form a communications network are selected to transmit local content via OFDM symbols which have sub-carriers modulated in accordance with the second modulation scheme. Thus, the second modulation scheme is used to convey data symbols from both the first data pipe and the local insertion pipe. Because of the arrangement of the second modulation scheme with respect to the first modulation scheme, the data symbols from the first data pipe may be received even when transmitted on the same radio frequency carrier, because detection of a constellation point from the first modulation scheme will require a lower signal to noise ratio than the second modulation scheme. This is because the first modulation scheme forms a sub-set of constellation points in the complex plane of the second modulation scheme, which can be thought of as a more coarse version of the second modulation scheme, so that differentiation between constellation points of the first modulation symbols in the complex plane allows the data from the first data pipe to be more easily recovered. Furthermore, because other base stations may not be communicating the local insertion pipe data, the receiver, within the geographical area in which these other base stations are disposed, will still be able to detect the data from the first data pipe. This is because OFDM signals transmitted from a neighbouring base station on the common radio frequency carrier signal using the second modulation scheme will simply appear as noise with respect to a detector detecting OFDM symbols according to the first modulation scheme. Accordingly, an effective and efficient way of inserting local content in a single frequency network is provided.

The local pilots can be inserted by either pre-allocating there location within the data or puncturing the local data, which replaces local service data symbols with local pilot symbols.

According to the present invention there is provided a transmitter for communicating data using Orthogonal Frequency Division Multiplexed (OFDM) symbols, the OFDM symbols including a plurality of sub-carrier symbols formed in the frequency domain for modulating with the data to be carried and pilot sub-carriers and the transmitter is arranged to form a Multiple Input Multiple Output (MIMO) scheme. The transmitter comprises a modulator arranged in operation to receive on a first input, national broadcast data symbols from a first data pipe according to a national broadcast channel for transmission, to receive on a second input, local service data symbols from a local service insertion data pipe according to a local service channel for transmission, and to modulate the data bearing sub-carrier signals of the OFDM symbols with either the national broadcast data symbols or the local service data symbols and the national broadcast symbols. The modulation of the data bearing sub-carrier signals of the OFDM symbols with the national broadcast data symbols is performed by mapping the data symbols according to a first modulation scheme, and the modulation of the sub-carrier signals of the OFDM symbols with the local service data symbols and the national broadcast data symbols is performed by mapping the national broadcast data symbols and the local service data symbols according to a second modulation scheme. A MIMO encoder is arranged to receive the OFDM symbols and to form at least first and second versions of the OFDM symbols, a frequency interleaver arranged to receive the first and second versions of the OFDM symbols and to interleave the position of the respective modulated sub-carriers; and a pilot signal inserter arranged to receive the first and second version of the OFDM symbols and to insert first pilot symbols at the pilot sub-carrier locations of the first version of the OFDM symbols and second pilot symbols at the pilot sub-carrier locations of the second version of the OFDM symbols; and a radio frequency modulator which is arranged to modulate a radio frequency carrier signal with the first and second versions of the OFDM symbols for transmission via first and second antennas respectively. The first modulation scheme is a lower order modulation scheme providing first modulation symbols with values from a smaller number of constellation points in the complex plane than the second modulation scheme which is a higher order modulation scheme, the second modulation scheme providing second modulation symbols with values which are disposed in the complex plane about corresponding values of the first modulation scheme, with the effect that detection of one of the second modulation symbols of the second modulation scheme will provide the local insertion data symbols and the national broadcast data symbols and allow detection of national broadcast modulation symbols from the first modulation scheme providing the national broadcast data symbols, in the presence of modulation symbols from the second modulation scheme. If the modulator is arranged to modulate the data bearing sub-carriers with both the local service data symbols and the national broadcast symbols, the transmitter is arranged to to generate local pilot symbols at predetermined locations within the first and second OFDM symbols, to de-interleave the local pilot symbols from the locations within the first and second OFDM symbols, the de-interleaving being a reverse mapping of the interleaving performed by the frequency interleaver, and to include the local pilot symbols with the local service data symbols at the locations determined by the de-interleaving.

Embodiments of the present invention are arranged to include local pilot symbols which with local service data symbols when communicated with national broadcast data symbols which are communicated using modulation symbols of a second modulation scheme whereas when transmitting the national broadcasting data symbols alone a first modulation scheme is used, which is related to the second modulation scheme in a hierarchical manner. The local pilot symbols can be used by a receiver to estimate a channel via which the local service modulation symbols have passed, which can allow the local service data symbols modulated using the second modulation scheme to be detected in the presence of OFDM symbols modulated with the first modulation scheme. However, if the transmitter and a receiver are arranged to form a MIMO scheme which is to be used with a conventional transmitter architecture also used for a SISO or a MISO scheme then an additional technical problem is created because pilot sub-carrier symbols are conventionally introduced after frequency interleaving has been performed. However the local pilots must be inserted with the local service data as part of the second modulation scheme, which must be introduced before the frequency interleaver. Accordingly embodiments of the present invention provide a transmitter with a frequency de-interleaver which receives a representation of a location of the local pilot symbols to be introduced into the OFDM symbols and de-interleaves those locations so that when the OFDM symbols have passed through the frequency interleaver of the transmitter, the local pilot symbols are once again arranged on sub-carriers at their desired locations.

A receiver can be therefore arranged to detect and recover data from OFDM symbols communicated by a communication system which is arranged such that one or more base stations from a plurality of base stations which form a communications network are selected to transmit local content via OFDM symbols which have sub-carriers modulated in accordance with the second modulation scheme and which implement a MIMO scheme. Thus, the second modulation scheme is used to convey data symbols from both the first data pipe and the local insertion pipe. Because of the arrangement of the second modulation scheme with respect to the first modulation scheme, the data symbols from the first data pipe may be received even when transmitted on the same radio frequency carrier, because detection of a constellation point from the first modulation scheme will require a lower signal to noise ratio than the second modulation scheme. This is because the first modulation scheme forms a sub-set of constellation points in the complex plane of the second modulation scheme, which can be thought of as a more coarse version of the second modulation scheme, so that differentiation between constellation points of the first modulation symbols in the complex plane allows the data from the first data pipe to be more easily recovered. Furthermore, because other base stations may not be communicating the local insertion pipe data, the receiver, within the geographical area in which these other base stations are disposed, will still be able to detect the data from the first data pipe. This is because OFDM signals transmitted from a neighbouring base station on the common radio frequency carrier signal using the second modulation scheme will simply appear as noise with respect to a detector detecting OFDM symbols according to the first modulation scheme. Accordingly, an effective and efficient way of inserting local content in a single frequency network is provided.

The local pilots can be inserted by either pre-allocating there location within the data or puncturing the local data, which replaces local service data symbols with local pilot symbols.

Various further aspects and features of the present invention are defined in the appended claims and include a method of receiving.

BRIEF DESCRIPTION OF DRAWINGS

Embodiments of the present invention will now be described by way of example only with reference to the accompanying drawings in which like parts are referred to using the same numerical designations and in which:

FIG. 24b is a schematic block diagram of an equaliser of national broadcast modulation symbols of the OFDM detector shown in FIG. 24a; and FIG. 24c is a schematic block diagram of an equaliser of local service modulation symbols of the OFDM detector shown in FIG. 24a;

DESCRIPTION OF EXAMPLE EMBODIMENTS

As set out above embodiments of the present invention seek to provide, in one application, an arrangement in which local content can be transmitted within a single frequency network whilst allowing other parts of the network still to receive a primary broadcast signal or their own local content. One example illustration is where local content is required to be broadcast contemporaneously with a national broadcast television programme.

Figure 1:
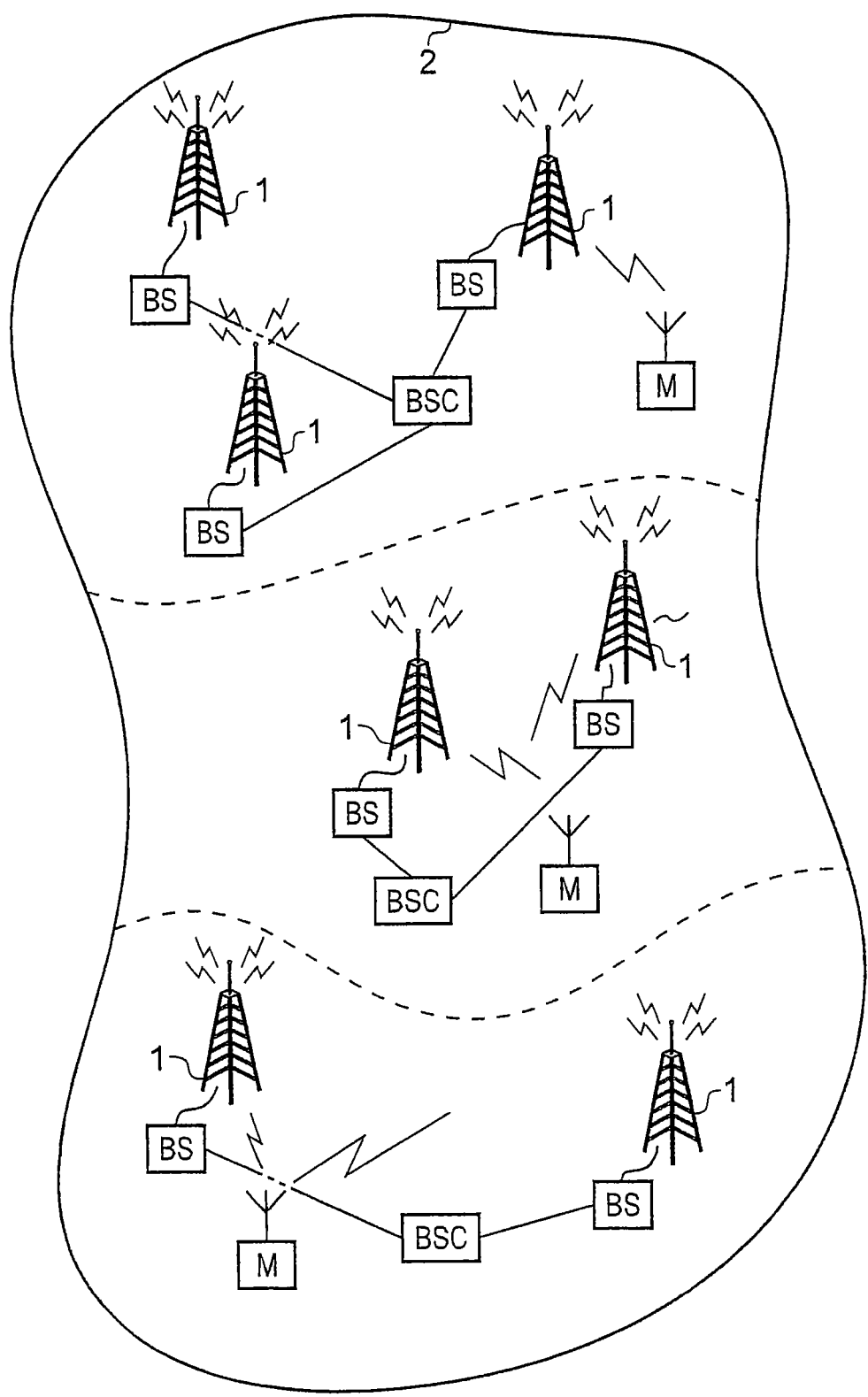
FIG. 1 is a schematic representation of a plurality of base stations which form a single frequency network for broadcasting for example video signals which may form part of a Next Generation Hand-held (NGH) TV broadcasting system.

FIG. 1 provides an example illustration of a network of base stations BS which are transmitting, via transmit antennas 1, a signal in accordance with a commonly modulated OFDM signal. The base stations BS are disposed throughout a geographical area within a boundary 2, which may be, in one example, a national boundary. As explained above in a single frequency network configuration the base stations BS are all broadcasting the same OFDM signal at the same time on the same frequency. Mobile devices M may receive the OFDM signal from any of the base stations. More particularly, the mobile devices M may also receive the same signal from other base stations because the signal is simultaneously broadcast from all of the base stations within the area identified by boundary 2. This so-called transmit diversity arrangement is typical of a single frequency OFDM network. As part of the detection of the OFDM signals in a receiver which is recovering data from OFDM symbols, energy from the transmitted OFDM symbols which is received for each symbol from different sources is combined in the detection process. Thus transmitting the same signal from different base stations can improve the likelihood of correctly recovering the data communicated by the OFDM symbols, provided that any component of the received OFDM symbol or echo of that OFDM symbol falls within a total guard interval period allowed for the network deployment.

As shown in FIG. 1, in some examples the base stations BS may be controlled by one or more base station controllers BSC, which may control the operation of the base stations. In some examples the base station controllers BSC may control one or more of the base stations within a part of the network associated with a geographical area. In other examples the base station controllers BSC may control one or more clusters of base stations so that the transmission of local content is arranged with respect to a time division multiplexed frames.

As mentioned above, the area identified by the boundary 2 could correspond to a national boundary so that the network of base stations is a national network. As such, in one example the television signals broadcast nationally are each transmitted from the base stations BS shown in FIG. 1. However embodiments of the present technique are aimed at addressing a technical problem associated with providing an arrangement for transmitting locally broadcast signals from some of the base stations shown in FIG. 1 but not others. An example of such an arrangement might be if local broadcast news or traffic news which is associated with a particular area is broadcast from some of the base stations but not others. In a multi-frequency network this is trivial, because the signals for the local broadcast maybe transmitted from different transmitters on different frequencies and therefore detected independently of what is broadcast from other base stations. However in a single frequency network a technique must be provided in order to allow for local service insertion of content for some of the base stations but not others or different local content at different base stations.

Figure 2:
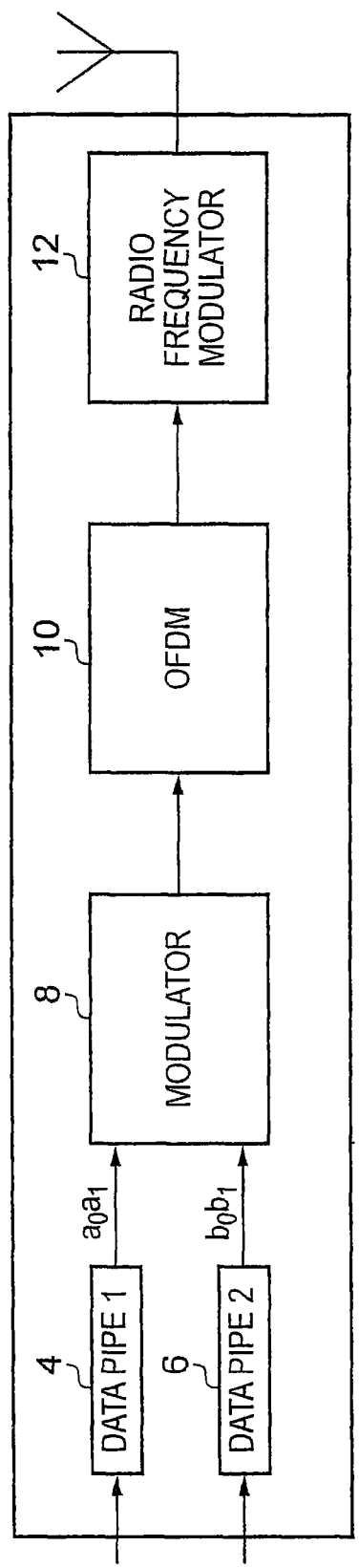
FIG. 2 is a schematic block diagram of an example transmitter according to the prior art.

As mentioned above prior art document US 2008/0159186 discloses a technique for combining two modulation schemes to form a modulation layer for each of a plurality of data sources. A transmitter which is implementing such an arrangement is shown in FIG. 2. In FIG. 2 data is fed from a first data pipe 4 and second data pipe 6 to a modulator 8, which modulates the data onto the sub-carriers to form an OFDM symbol. The modulation is performed in such a way that the data from the first data pipe 4 can be detected separately from the detection of the data from both the first and the second data pipes 4, 6. An OFDM symbol former 10 then forms the OFDM symbol in the frequency domain as provided at the output of the modulator 8 and converts the frequency domain OFDM symbol into the time domain by performing an inverse Fourier transform in accordance with a conventional operation of an OFDM modulator/transmitter. The time domain OFDM symbols are then fed to a radio frequency modulator 12 which up converts the OFDM symbols onto a radio frequency carrier signal so that the OFDM signal may be transmitted from an antenna 14.

Figure 3B:
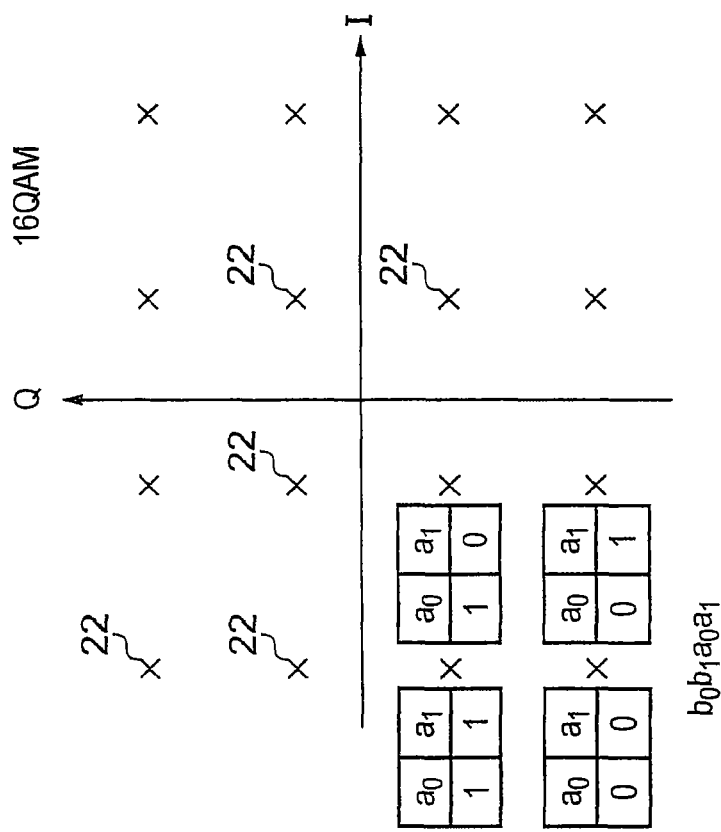
FIG. 3b is a schematic representation of a complex plane providing an illustration of signal constellation points for a second modulation scheme of 16 QAM according to the prior art.
Figure 3A:
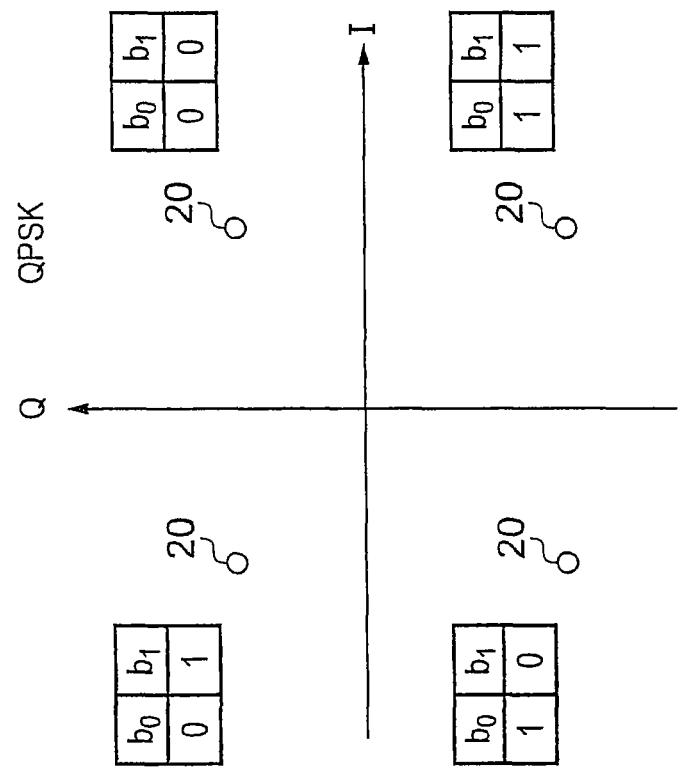
FIG. 3a is a schematic representation of a complex plane providing an illustration of signal constellation points for a first modulation scheme of QPSK.

The technique disclosed in US 2008/0159186 is illustrated in FIGS. 3a and 3b. FIGS. 3a and 3b provide an illustration of signal constellation points in the complex plane comprising in-phase I and Quadrature-phase Q components. The example signal constellation points shown in FIG. 3a is for QPSK, whereas the example shown in FIG. 3b is for 16 QAM. In accordance with the known technique for obtaining multi-layer modulation, data from two sources is modulated onto the signal constellation points of a second modulation scheme. The signal constellation points of the second modulation scheme represent the possible modulation symbol values available for the modulation scheme. For the first modulation scheme shown in FIG. 3a, the signal constellation points for QPSK are provided as small circles "o" 20. As such the bits from a source B that is provided from the source data pipe 6 are mapped onto the signal constellation points as shown in FIG. 3a, so that each possible modulation symbol value represents two bits from the source b0b1 in conventional manner using Grey coding for example.

The second modulation scheme shown in FIG. 3b is 16 QAM, which provides 16 possible signal constellation points 22 represented as "x". In addition to the modulation of the signal by data from the first data pipe 6, which is shown as b0b1 a selection of one of the constellation points from each of the four quadrants shown in FIG. 3b also identifies one of the four possible values for two bits from the second source data pipe 4 for the values a0a1 Thus detection of one of the signal points shown in FIG. 3b will not only identify a value for a0a1, but also a value for b0b1 depending upon which of the four quadrants from which the signal point is detected. Accordingly, a mutli-layer modulation scheme can be made.
Transmitter Embodiments of the present technique provide an arrangement which utilises the multi-layer modulation technique according to US 2008/0159186 to provide a local broadcast service for local content whilst still allowing base stations in neighbouring areas to detect a national broadcast signal.

Figure 4:
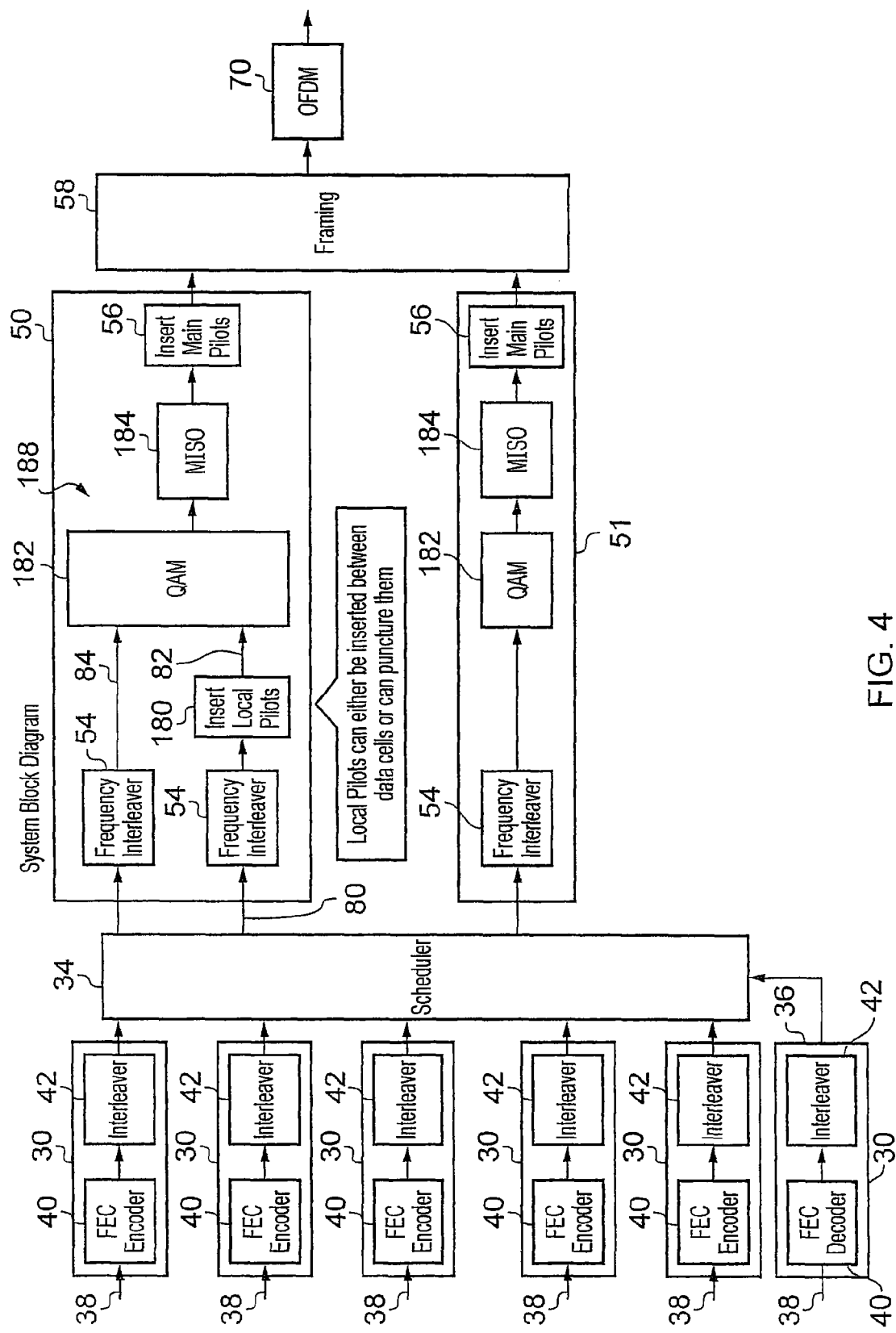
FIG. 4 is a schematic block diagram of part of a transmitter used in one or more of the base stations shown in FIG. 1 according to the present technique which supports SISO or MISO.

A transmitter embodying the present technique, which might be used to insert local content at one of the base stations shown in FIG. 1 is shown in FIG. 4. In FIG. 4 a plurality n of Physical Layer data Pipes (PLP) 30 are arranged to feed data for transmission to a scheduler 34. A signalling data processing pipe 36 is also provided. Within each of the pipes the data is received for a particular channel from an input 38 at a forward error correction encoder 40 which is arranged to encode the data, for example, in accordance with a Low Density Parity Check (LDPC) code. The encoded data symbols are then feed into an interleaver 42 which interleaves the encoded data symbols in order to improve the performance of the LDPC code used by the encoder 40.

The scheduler 34 then combines each of the modulation symbols from each of the data pipes 30 as well as the signalling processing pipe 36 into data frames for mapping onto OFDM symbols. The scheduled data is presented to a data slice processing unit 50, 51, 52 which includes a frequency interleaver 54, a local pilot generator 180, a modulator 182, an optional MISO processing unit 184 and a pilot generator 56.

The data slice processor arranges the data for a given PLP in such a manner so that it will occupy only certain sub-carriers of the OFDM symbol. The data output from the data slice processors 50, 51, 52 is then fed to a Time Division Multiple Access (TDMA) framing unit 58. The output of the TDMA framing unit 58 feeds an OFDM modulator 70 which generates the OFDM symbols in the time domain which are then modulated onto a radio frequency carrier signal by an RF modulator 72 and then fed to an antenna for transmission 74.

As explained above, embodiments of the present invention provide a technique for allowing for local content to be broadcast from one or more base stations within a local area relating to a national area covered by the network shown in FIG. 1. To this end, the transmitter shown in FIG. 4 also includes a local service insertion data slice processor 80 which includes a frequency interleaver 54 and a local pilot generator 180. However, in addition, according to the present technique, the modulator 44 shown in the data slice processor 50 has a second input for receiving the data from the local service insertion data slice processor 80. According to the present technique the modulator 44 modulates the local service insertion data onto a related set of signal constellation points according to a second modulation scheme. The signal constellation points of the second modulation scheme, which is used for the local content as well as the primary data, are related to constellation points of the first modulation scheme which is used for just communicating the primary data from the PLP pipe n as will be explained with reference to FIGS. 5 and 6.

As shown in FIG. 4 the modulator 44 has a first input 82 which receives data from the data slice processor 50 and a second input 84 which receives data from the local service insertion data slice processor 80. In the following description the data from the data slice processor 50, will be referred to as the first or primary data pipe. In one example the data from the first data data slice processor 50 carries a national broadcast channel, which would be communicated throughout the entire network of FIG. 1.

Figure 5:
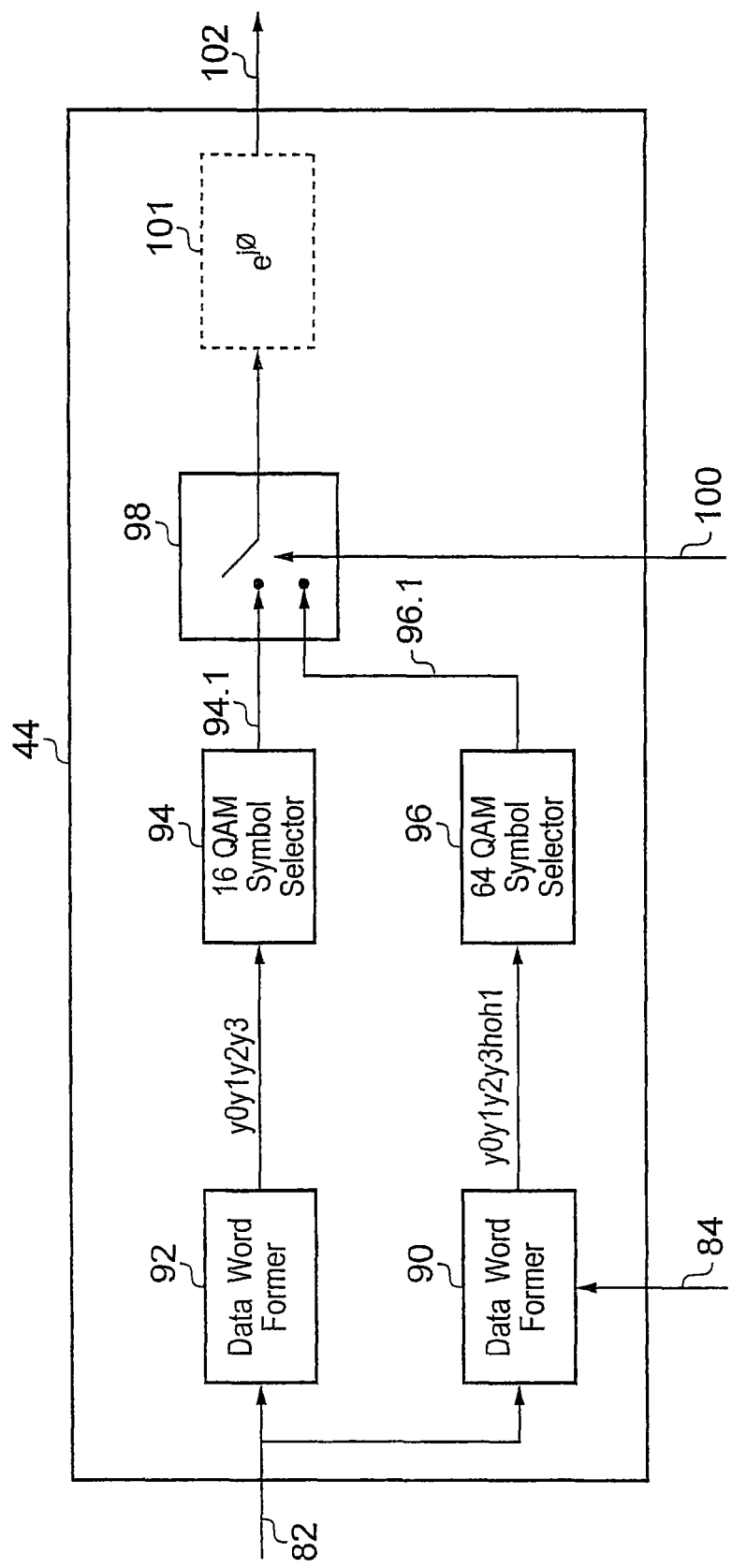
FIG. 5 is a schematic block diagram of an example modulator which forms part of the transmitter shown in FIG. 4.

The modulator 44 is shown in more detail in FIG. 5. As shown in FIG. 5 the data from the local service insertion pipe 80 is fed from the second input 84 into a first data word former 90. The data from the first data pipe is fed from the first input 82 into a second data word former 92. The data from the first data pipe when received in the data word former 92 is arranged to form four groups of bits y0y1y2y3 for mapping onto one of 16 possible values of a 16 QAM modulation symbol within a symbol selector 94. Similarly, the data word former 90 forms the data from the first data pipe 82 into data words comprising four bits y0y1y2y3. However, the data word former 90 also receives the data symbols from the local service insertion pipe 80 and so appends two of the bits from the local service insertion data pipe 84 to the data bits from the first data pipe 82 to form a six bit data word y0y1y2y3h0h1, which is four bits y0y1y2y3 from the symbol stream from the first data pipe 32 and two bits h0h1 from the local service insertion pipe 80, thus forming a six bit word for selecting one of 64 possible modulation symbol values of 64 QAM ($2^6$=64).

A symbol selector 96 is arranged to receive the six bit word y0y1y2y3h0h1 and in accordance with the value of that word select one of the 64 possible values of the 64 QAM modulation scheme to form at an output 96.1 a stream of 64 QAM symbols. The respective outputs from the symbol selectors 94, 96 are then fed to a switch unit 98 which also receives on a control input 100 an indication as to when the local content received from the local service insertion pipe 90 is present and is to be broadcast from the base station. If the local service insertion data is to be broadcast from the base station then the switch 98 is arranged to select the output 96.1 from the 64 QAM symbol selector 96. If not then the switch is arranged to select the output 94.1 from the 16 QAM symbol selector 94. Modulation symbols are therefore output from the modulator 44 for transmission on the OFDM symbols on an output channel 102.

The control input 100 may provide, in some examples, a control signal which indicates when local content is being transmitted from the local service insertion data slice processor 80. The control signal provided in the control input 100, may be generated from a base station controller to which the transmitter within the base station is connected.

In other examples the signalling data processing pipe 36 may be arranged to communicate via L1 signalling data an indication to when the local service insertion pipe 80 is or will be transmitting the local data. Thus a receiver may recover may detect and recover the L1 signalling data and determine when or whether the local content is being or will be transmitted. Alternatively, the receiver may be provided with a data providing a schedule of when the local content data is to be transmitted, by some other means, such as by pre-programming the receiver.

Deployment of Base Stations

Figure 6:
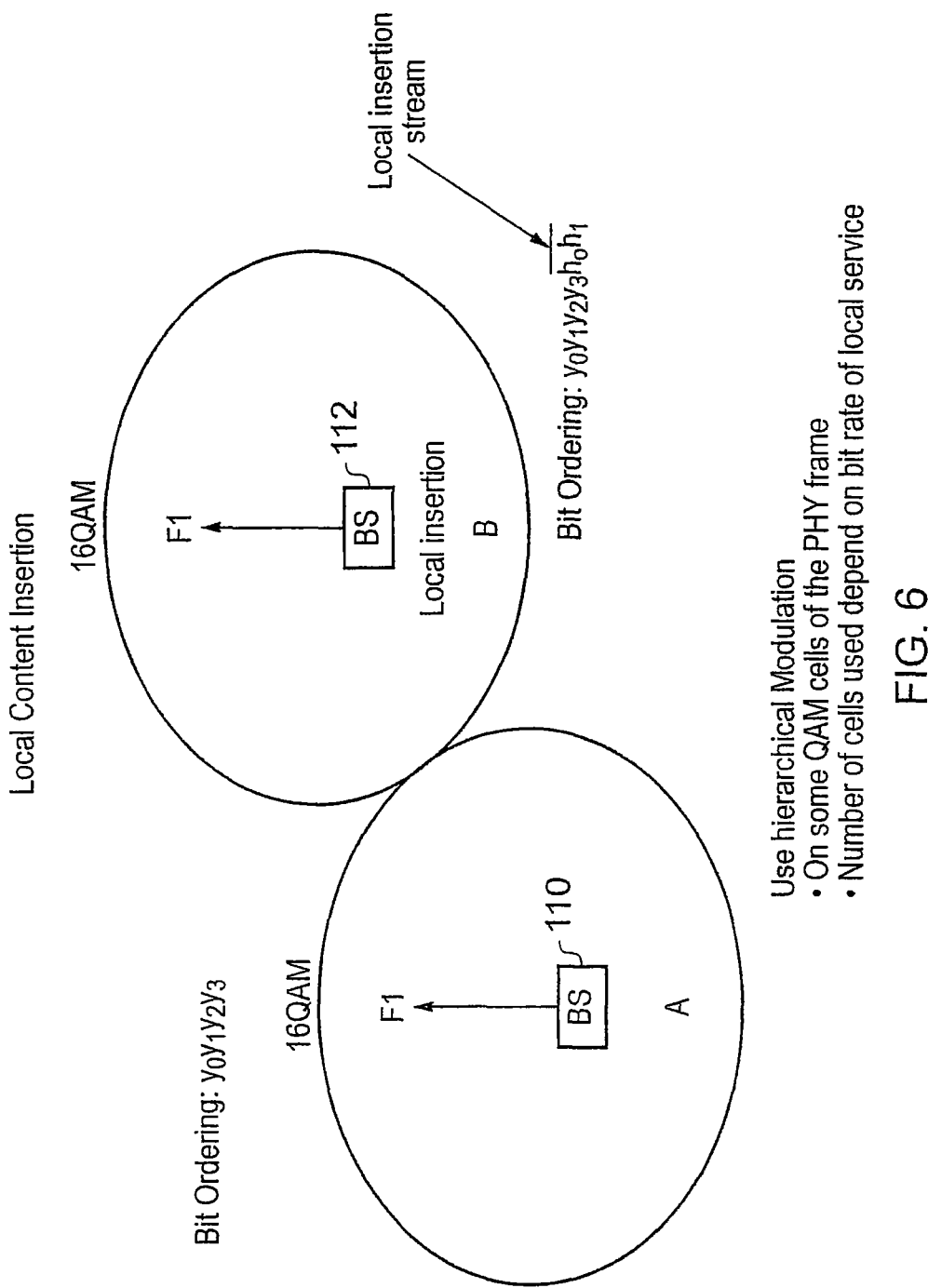
FIG. 6 is an illustrative representation of two neighbouring base stations forming two cells A and B which are using a first modulation scheme of 16 QAM and a second modulation scheme of 64 QAM respectively.

FIG. 6 provides an example illustration of an arrangement which may be produced within FIG. 1 in which a first base station BS 110 may transmit data from the first data pipe 32 within a cell A, whereas a neighbouring base station BS 112 transmits data within a second cell B, the transmitted data including data from the first data pipe 32 but also the local service insertion data from the local service insertion pipe 80. Thus the base station 110 from the cell A is transmitting an OFDM symbol with sub-carriers modulated using 16 QAM whereas the base station 112 from the cell B is transmitting the OFDM symbols by modulating sub-carriers with 64 QAM. Thus as shown in FIG. 6 as the bit ordering shows, the final two bits h0h1 are used to select a finer detail of a signal constellation point according to 64 QAM whereas the bits y0y1y2y3 are used to select one of the 16 QAM symbols in a coarser grid within the complex plane.

As already explained, both of the base stations 110, 112, within the cells A and B will be transmitting the OFDM symbols contemporaneously on the same frequency. As such a receiver in a mobile terminal will receive a combined OFDM signal as if, in part, the signal was being received via different paths in a multi-path environment. However, the OFDM signal transmitted from base station 110 within cell A comprises OFDM symbols modulated using the first modulation scheme 16 QAM whereas the OFDM symbols transmitted from the base station 112 within cell B will be modulated using the second modulation scheme 64 QAM. At the receiver within the mobile terminal, a proportion of the total power with which the OFDM symbols are received with the first modulation scheme and the second modulation scheme will depend on the proximity of a mobile device M to each of the transmitters within the cells A and B. Furthermore, the likelihood of correctly recovering the data symbols from the first data pipe and the local service insertion pipe will depend on the extent to which the receiver can detect OFDM symbols according to the first modulation scheme 16 QAM transmitted from cell A or OFDM symbols according to 64 QAM transmitted from cell B in the presence of OFDM signals modulated with the second and the first modulation schemes respectively.

Figure 7:
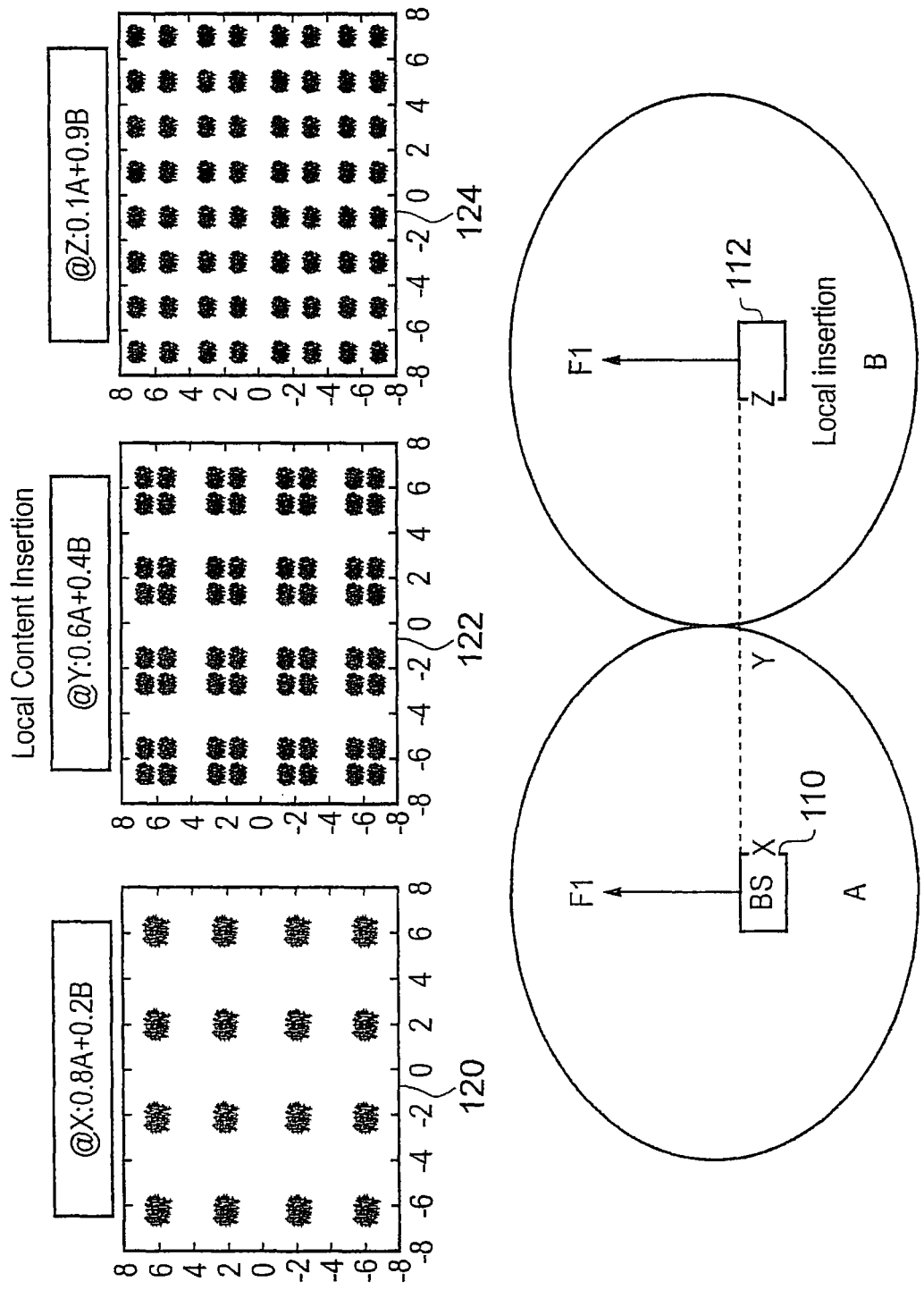
FIG. 7 is a schematic representation showing the effects on the constellation points as received by a mobile device at three different positions X, Y, Z between the two base stations A and B of FIG. 6.
Figure 8:
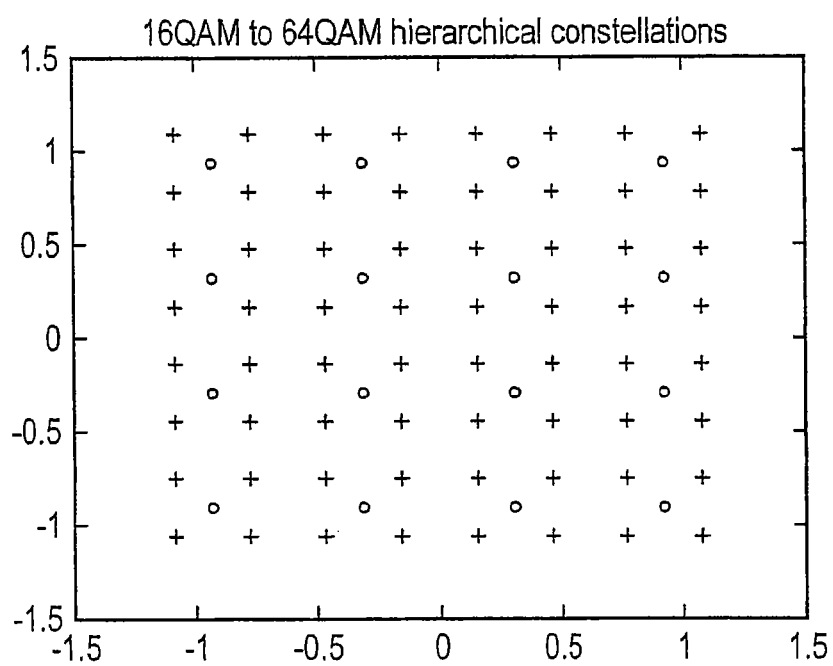
FIG. 8 is an illustrative representation of constellation points in a complex plane for a first modulation scheme of 16 QAM superimposed on a second modulation scheme of 64 QAM.

As shown in FIG. 7 three plots 120, 122, 124 of possible simulated signal constellation values are shown for an example of 16 QAM and 64 QAM which are shown for example in FIG. 8. The first left hand plot 120 provides a plot in the complex plane of received modulation symbol values when the transmitters in the base stations 110, 112 of cells A and B are transmitting OFDM symbols with sub-carriers modulated with 16 QAM and 64 QAM modulation schemes respectively, because cell B is transmitting local service insertion data. The first plot 120 corresponds to a mobile device being at position X for which it is assumed that 80% of the received signal power is from cell A and 20% of the received signal power is from cell B. As can be seen in FIG. 7 the plot 120 provides discrete signal points in accordance with a 16 QAM received signal, but with an apparent increase in noise as a result of a spread of possible points caused by the 20% power coming from the cell B which is transmitting 64 QAM modulation symbols.

Correspondingly, a middle plot 122 provides a plot of signal values in the complex plane when the receiver is at position Y and for which it is assumed that 60% of the received power is from cell A and 40% of the received power is from cell B. As can be seen, although the signal constellation plots are grouped into clusters corresponding to an association with each of the possible values of a 16 QAM symbol, discrete constellation points have been formed in accordance with a 64 QAM modulation scheme. Thus it will be appreciated that if the signal to noise ratio is high enough then a receiver at position Y can detect one of the 64 QAM signal points and therefore recover the local inserted data. Correspondingly, a right hand plot 124 illustrates the case at position Z, for which it is assumed, for example, that only 10% of the signal power comes from the cell A and 90% of the signal power comes from cell B. Therefore, as shown in the plot 124, clearly each of the 64 QAM signal constellation points are available for detecting and recovering data, which is produced for both the first data pipe and the local service insertion data pipe. Accordingly, it will be appreciated that depending on the position of the receiver, a mobile terminal can recover the locally transmitted data and the data transmitted from the first data pipe (for example the national broadcast) when in or around cell B, whereas in cell A a receiver will still be able to recover the data from the first data pipe. Therefore an effect of using the layered modulation provided by the second modulation scheme of a 64 QAM signal and the first modulation scheme 16 QAM will not disrupt the reception of the nationally broadcast data when locally broadcast data is transmitted from a neighbouring cell.

TDMA Local Service Insertion

A further enhancement which some embodiments of the present technique may use is to distribute the capacity for local service transmission between a cluster of neighbouring cells to the effect that the local content transmitted using the higher order (second) modulation scheme is transmitted at different times in different cells. This technique is illustrated with reference to FIGS. 9a, 9b and 9c.

Figure 9A:
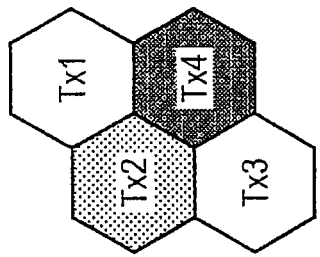
FIG. 9a is an illustrative representation of a cluster of four cells served by four base stations according to the present technique.
Figure 9C:
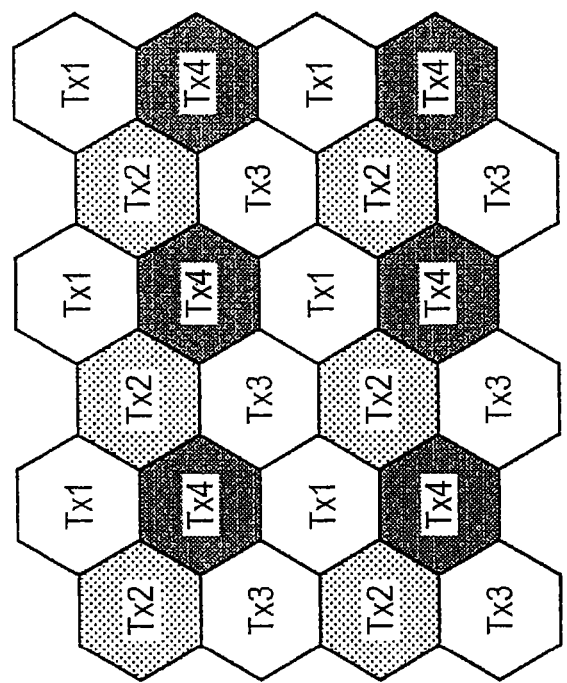
FIG. 9c is an illustrative representation of a pattern of cell clusters according to the present technique.

In FIG. 9a a cluster of four cells is shown. These are shown with different grades of shading and are labelled respectively Tx1, Tx2, Tx3, Tx4. Thus FIG. 9a illustrates a cluster of four cells. As will be appreciated in addition to receiving the data from the first data pipe, which may be for example the national broadcast channel, a regional broadcast may also be provided using the local data insertion pipe in combination with the higher order hierarchal modulation technique as explained above. However as explained above when the second or higher order modulation technique is being used, the effect is to introduce noise or interference which reduces the signal to noise ratio for receivers receiving the data from the first communications channel that is the national broadcast using the first or lower order modulation scheme. More specifically, for example, if the national broadcast signal from the first data pipe is modulated using QPSK and the combined first communications channel and the local service insertion channel are modulated onto the second or higher order modulation scheme of 16 QAM then the 16 QAM broadcast will appear as an increase in noise for a receiver trying to receive the OFDM symbols modulated with the QPSK modulation scheme.

In order to reduce the amount of interference caused by the second/higher order modulation scheme (16 QAM) with respect to the first/lower order modulation scheme (QPSK) the cells which broadcast the OFDM signals are clustered as shown in FIG. 9a. Furthermore the transmitters within the four cell cluster illustrated in FIG. 9a take turns on a frame by frame basis to broadcast the higher order 16 QAM modulation signal providing data symbols from the first data communications pipe and their local service insertion pipe. Such an arrangement is illustrated in FIG. 9b.

Figure 9B:
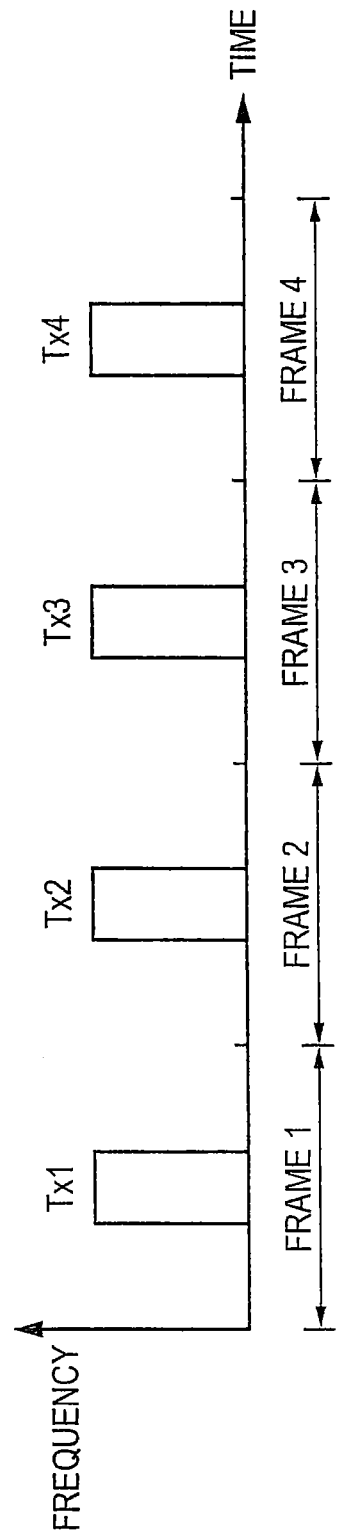
FIG. 9b is a graphical representation of a plot of frequency with respect to time providing an illustration of a time division multiplexed frame structure.

In FIG. 9b a TDMA frame composed of four physical layer frames is shown. The physical layer frames are labelled frame 1, frame 2, frame 3 and frame 4. Within each physical layer frame the OFDM signals are communicating data from various PLPs. As explained above contemporaneously with the transmission of the data for the first data pipe using QPSK, OFDM symbols carrying data from both the first data pipe and the local service insertion pipe are also transmitted using for example 16 QAM. However in order to reduce the interference caused by the 16 QAM modulation only one of transmitters Tx1, Tx2, Tx3, Tx4 within the cluster of four cells is allowed to transmit OFDM symbols with the higher order 16 QAM modulated sub-carriers during each physical layer frame of the TDMA frames. Thus in physical layer frame 1, only Tx1 transmits the OFDM symbols with sub-carriers modulated with 16 QAM to provide data from the combined first data pipe and its local service insertion pipe, whilst in frame 2 only transmitter Tx2 transmits the OFDM symbols with 16 QAM, and thereafter TX3 in frame 3 and TX4 in frame 4. Then the pattern repeats for the next TDMA frame. In each case, all other transmitters are transmitting OFDM symbols modulated with QPSK or the constellation used for carrying only the first data pipe.

As a result of time dividing the transmission of the local service insertion data between each of the four transmitters Tx1, Tx2, Tx3, Tx4, effectively the local data rate is a quarter of that of the first data pipe. Thus each cell transmits local service insertion content every fourth physical layer frame. However correspondingly because the higher order modulation scheme is only transmitted from a cell once in every four frames, the effective interference experienced by receivers located in the coverage area of the four cells that wish to receive the first/lower order modulations scheme (QPSK) is correspondingly reduced. Thus in a pattern of cells illustrated in FIG. 9c, the interference which is caused by the local service insertion data and would appear as increased noise to the receiver is distributed throughout the cluster of four cells. Therefore the relative interference or increasing noise caused by the local service insertion data is reduced. This can be considered to be the equivalent of frequency re-use in a multi frequency network. For the example illustrated in FIGS. 9a, 9b, 9c, the following table represents the transmission of OFDM symbols with each of the first (16 QAM) and second (64 QAM) modulation schemes:

|  | Frame 1 | Frame 2 | Frame 3 | Frame 4 |
|---|---|---|---|---|
| Tx1 | 64 QAM | 16 QAM | 16 QAM | 16 QAM |
| Tx2 | 16 QAM | 64 QAM | 16 QAM | 16 QAM |
| Tx3 | 16 QAM | 16 QAM | 64 QAM | 16 QAM |
| Tx4 | 16 QAM | 16 QAM | 16 QAM | 64 QAM |

Table illustrating the modulation of OFDM symbols, when the local service insertion data is modulated using a second/higher modulation scheme of 64 QAM and the first/lower order modulation scheme is 16 QAM for carrying data symbols from the first/national data pipe.

As will be appreciated, a result of allocating the transmission of the local content over a cluster of four TDMA frames between a cluster of four base stations, may be to reduce the bandwidth for the local content service by one quarter, if a receiver is only able to receive the OFDM carrying signal from one base station only, which will typically be the case. The allocation of the local content to the transmitter of the base station in each cluster may be provided for example via signalling data provided by the signalling data pipe.

Although in the example provided above the cells are clustered into groups of four, it will be appreciated that any number can be used. Advantageously the cells are grouped into clusters of four to provide a balanced trade-off between an amount of baseband bandwidth (bit rate) afforded to the local service insertion service and an amount of reduction in the signal to noise ratio caused to the reception of data from the first data pipe using the lower order modulation scheme by the transmission of the higher order modulation scheme carrying data from both the first data pipe and the local service insertion channel. As such a cell structure shown in FIG. 9c can be used to transmit local content every fourth physical layer frame for a different group of four cells and the arrangement of the cell clustering repeated throughout to represent an equivalent arrangement of frequency re-use.

According to the present technique the transmitter within the base stations shown in FIG. 4 may be adapted to implement the TDMA frame structure illustrated above. In one example, the scheduler 34 for forming the modulated sub-carrier signals into the OFDM symbols and a framing unit 58 may be arranged to schedule the transmission of the OFDM symbols according to the time divided frame illustrated in FIG. 9b. The scheduler 34 and the framing unit 58 are arranged to transmit OFDM symbols which are carrying data symbols from both the first data pipe and the local service insertion pipe using the second modulation scheme as illustrated in the table above.

Equalisation of Combined Local Service Insertion and National Broadcast Signals

A further aspect of the present technique will now be described with reference to FIGS. 10 to 15. As explained above, data from a local service insertion channel is transmitted with data from a national broadcast channel using a higher order modulation scheme such as 16 QAM, whereas data from the national broadcast channel is transmitted using a lower order modulation scheme such as QPSK. A mobile receiver which is able to detect the local service insertion data which is conveyed with the data from the national broadcast channel by a 16 QAM modulation scheme may be required to detect the 16 QAM signal in the presence of a QPSK signal, which conveys data from the national broadcast channel only. The 16 QAM modulation scheme conveying data from the national broadcast channel and the local broadcast channel and the QPSK modulation scheme conveying the national broadcast channel are represented in FIGS. 3a and 3b and described above. In the following description the higher order modulation scheme which is conveying data according to the national broadcast channel and the local service insertion channel will be referred to as the local service insertion channel or data and the national broadcast channel will be referred as the national broadcast channel, data or signal.

A further ancillary problem addressed by an embodiment of the present technique is to provide a receiver which can equalise a signal received at the receiver which is a combination of the local service insertion signal that is the 16 QAM signal and the national broadcast signal that is the QPSK signal for example. Equalising a signal which is a combination of a national broadcast signal and a local service insertion signal, which is a combination of a 16 QAM and a QPSK signal is therefore addressed by a further aspect of the present technique.

Figure 10:
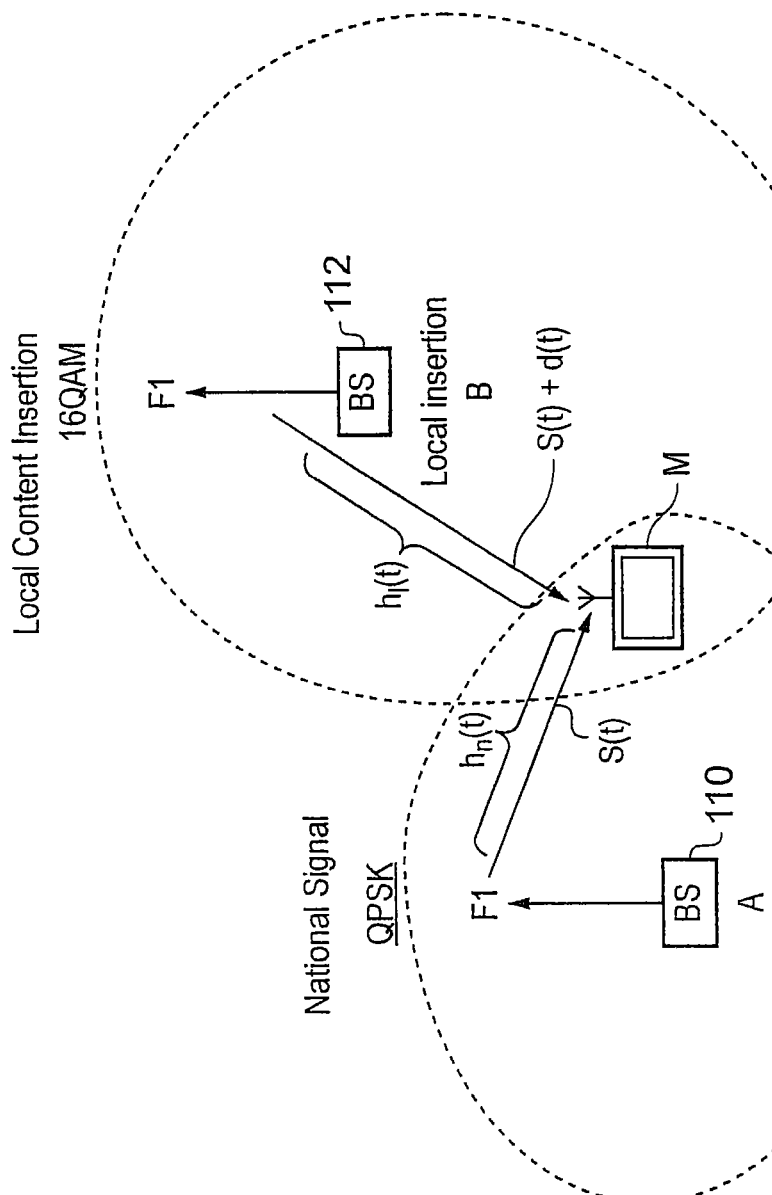
FIG. 10 is an illustrative representation of two neighbouring base stations forming two cells A and B which are using a first modulation scheme of 16 QAM and a second modulation scheme of 64 QAM respectively, and a mobile receiver which may be arranged to recover local service insertion data in the presence of signals from both the first modulation scheme and the second modulation scheme the signal from cell B transiting a channel impulse response $h_n(t)$ and the signal from cell A transiting a channel impulse response $h_l(t)$.

As shown in FIG. 10 a mobile receiver M is located at a position approximately equi-distant from the base station transmitting the local service insertion signal 112 and a base station transmitting the national broadcast signal 110. Thus the signal received by the mobile receiver M is comprised of a combination of the local service insertion signal s(t)+d(t) convolved with the channel $h_l(t)$ between the local service insertion base station 112 and the mobile receiver M and the national broadcast signal s(t) convolved with a channel $h_n(t)$ from the national broadcast base station 110 and the mobile receiver M. Thus the received signal r(t) is represented by the following equation (where the symbol '*' represents convolution):

$$r(t) = h_n(t) * s(t) + h_l(t) * [s(t) + d(t)]$$
$$= s(t) * [h_n(t) + h_l(t)] + d(t) * h_l(t)$$

Following an FFT in which the received signal is transformed into the frequency domain, the signal formed at the output of the FFT is:

$$R(z)=S(z)[H_n(z)+H_l(z)]+D(z)H_l(z)$$

Figure 11B:
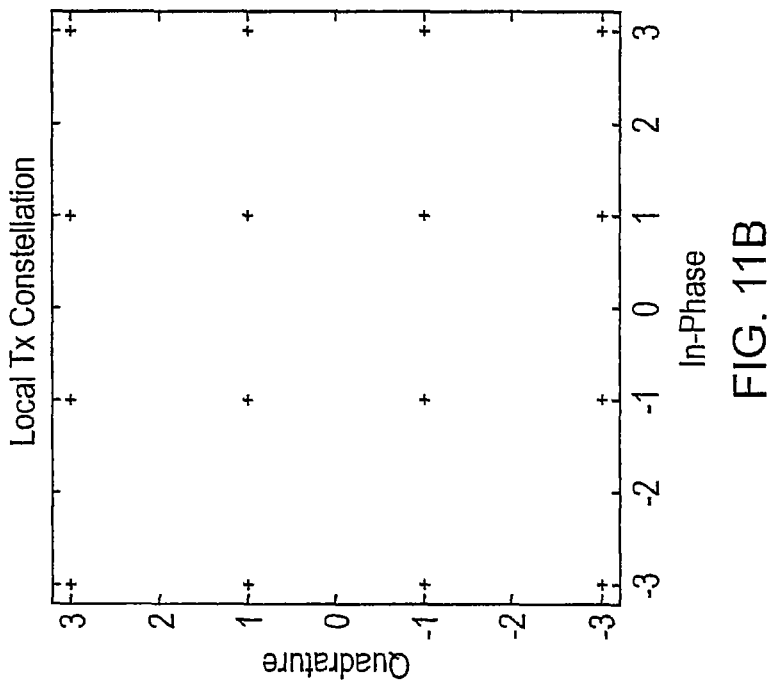
FIG. 11b is a schematic representation of a complex plane providing an illustration of signal constellation points for a second modulation scheme of 16 QAM wherein reception is without noise and perfect channel estimation.
Figure 11A:
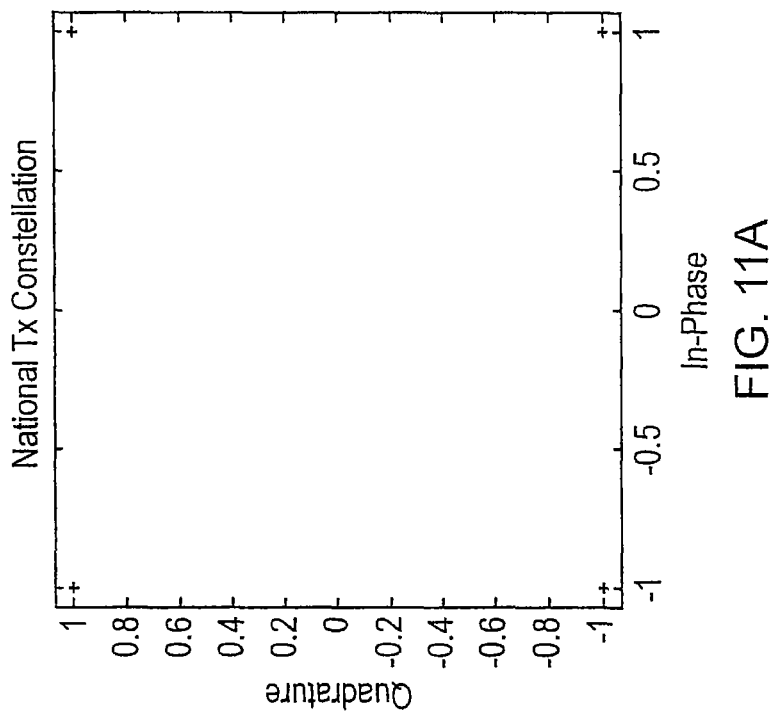
FIG. 11a is a schematic representation of a complex plane providing an illustration of signal constellation points for a first modulation scheme of QPSK.

A signal constellation therefore can be represented in the complex plane for the national broadcast signal as shown in FIG. 11a, and the local insertion signal as shown in FIG. 11b; the national broadcast signal being QPSK as shown in FIG. 11a and the local service insertion signal being 16 QAM shown in FIG. 11b. Thus the national broadcast signal of FIG. 11a provides a lower order modulation scheme with respect to the higher order modulation scheme of 16 QAM shown in FIG. 11b. However, the representation of the signals shown by the constellation points of FIGS. 11a and 11b are without noise and moreover, without the presence of either of the other signals.

Figures 12A, 12B:
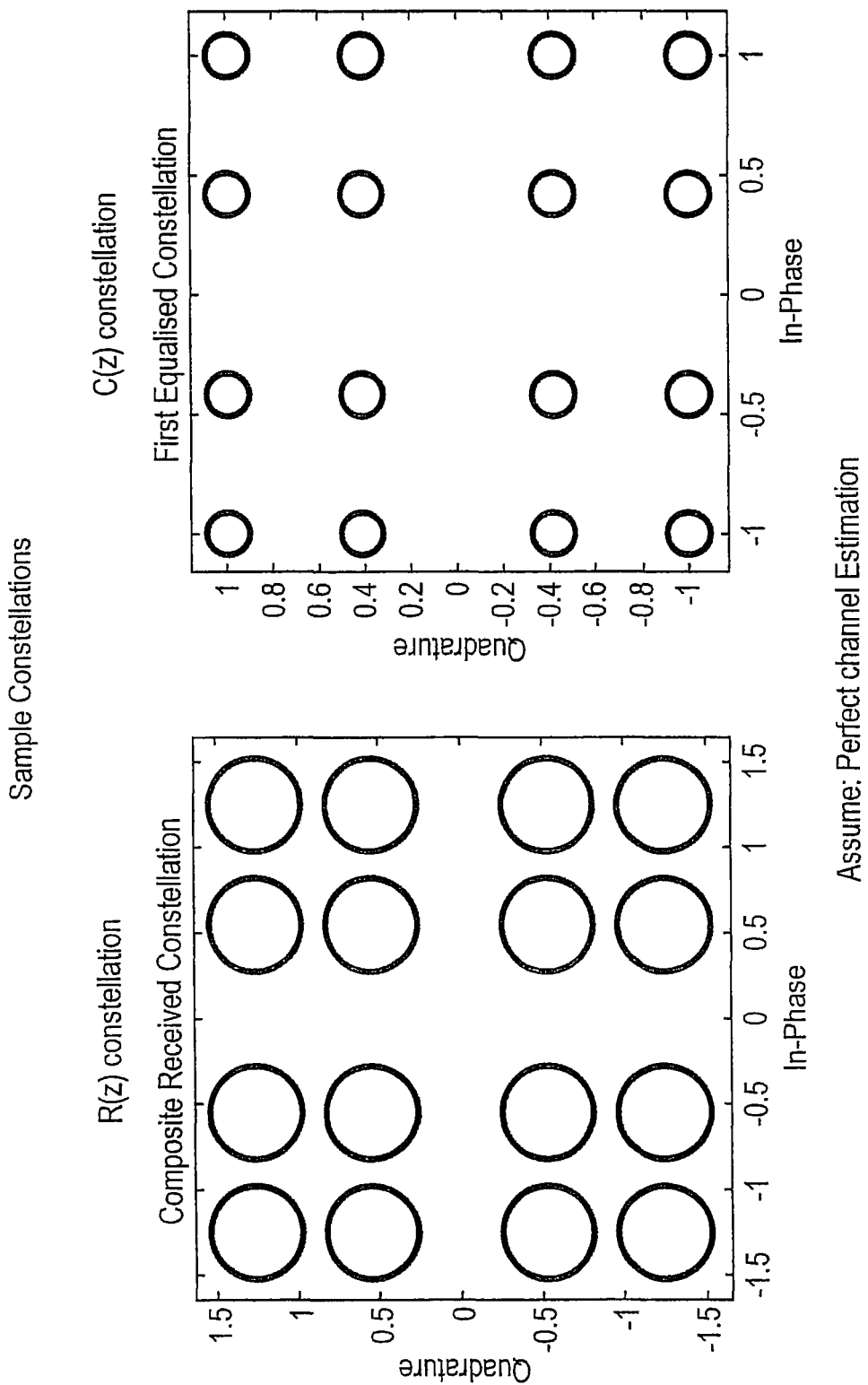
FIG. 12a is a schematic representation of a complex plane providing an illustration of signal constellation points for a first modulation scheme of QPSK, when received in the presence of the second modulation scheme; but with the signal from each cell transiting through channels of different channel impulse responses and FIG. 12b provides a corresponding representation of the same signal after equalisation using a conventional equaliser with perfect channel estimation.

FIGS. 12a and 12b provide a corresponding representation of the signal constellation in the complex plane where the mobile receiver M receives a signal in the presence of both the national broadcast signal s(t) and the locally broadcast signal s(t)+d(t) and where the channel responses $H_n(z)$ and $H_l(z)$ are not equal. In FIG. 12a the signal constellation of R(z) the combined signal as expressed above is a combination of the national broadcast signal and the local broadcast signal. FIG. 12b shows the effect of dividing the received signal R(z) by $[H_n(z)+H_l(z)]$ which is a combination of the channels from the base station of the national broadcast signal 110 and the channel of the local insertion base station 112, to produce C(z). The diagram in FIG. 12b is assuming perfect channel estimation and without noise. As can be seen from FIG. 12b only a small amount of noise will be required in order to cause a false detection of a particular modulation symbol of the local broadcast signal. The division of R(z) by the combined channel forms an equalised signal C(z):

$$C(z) = \frac{R(z)}{[H_n(z) + H_l(z)]}$$
$$= S(z) + \frac{H_l(z)}{[H_n(z) + H_l(z)]} D(z)$$

However we do not know $H_n(z)$ and $H_l(z)$ separately, and so the following cannot be computed:

$$\frac{H_l(z)}{[H_n(z) + H_l(z)]}$$

According to the present technique in order to recover the local insertion signal from the national broadcast signal, it is necessary to determine either the channel $H_n(z)$ from the national base station 110 or the channel $H_l(z)$ from the local service insertion base station 112 separately. With knowledge of either the national broadcast channel $H_n(z)$ or the local insertion channel $H_l(z)$ it would be possible to compute the term D(z). Thus, first detecting the national broadcast signal using the lower order modulation scheme and subtracting the detected signal from the received signal it is then possible with knowledge of either the channels from the national broadcast base station $H_n(z)$ or the local service insertion signal base station $H_l(z)$ to recover the local signal D(z). Thus, according to the present technique the term $H_l(z)D(z)/[H_n(z)+H_l(z)]$ is treated as noise and the national broadcast data is recovered by slicing S(z) to give an estimate of the national broadcast signal Ŝ(z) Accordingly, by calculating the composite channel $[H_n(z)+H_l(z)]$ from the national broadcast base station $H_n(z)$ and the local service insertion signal base station $H_l(z)$ and convolving with the estimate of the national broadcast signal (by multiplication in the frequency domain) it is possible to subtract this combination from the received signal to form an estimate of the local service insertion signal convolved with the channel from the local service insertion base station.

Therefore to detect the local service insertion signal, the following steps are required:
1. Estimate S(z) as Ŝ(z) by considering $$\frac{H_l(z)}{[H_n(z) + H_l(z)]} D(z)$$

as noise when slicing S(z);
2. The equaliser has already computed $[H_n(z)+H_l(z)]$ as the combined channel from the national OFDM reference pilots;
3. Compute $D(z)H_l(z) \approx R(z) - \hat{S}(z)[H_n(z)+H_l(z)]$; which provides a complex signal as shown in the complex plane diagram in FIG. 13a;
4. If some of the D(z) are known from additional pilots provided in the local service insertion signal, then $H_l(z)$ can be estimated to give $\hat{H}_l(z)$
5.

$$\hat{H}_l(z) \approx \frac{R(z) - \hat{S}(z)[H_n(z) + H_l(z)]}{D(z)}$$

6. Interpolation can be performed on $\hat{H}_l(z)$ in the frequency direction to form $H_l(z)$ and so
7.

$$\tilde{D}(z) \approx \frac{R(z) - \hat{S}(z)[H_n(z) + H_l(z)]}{\hat{H}_l(z)}$$

Figures 13A, 13B:
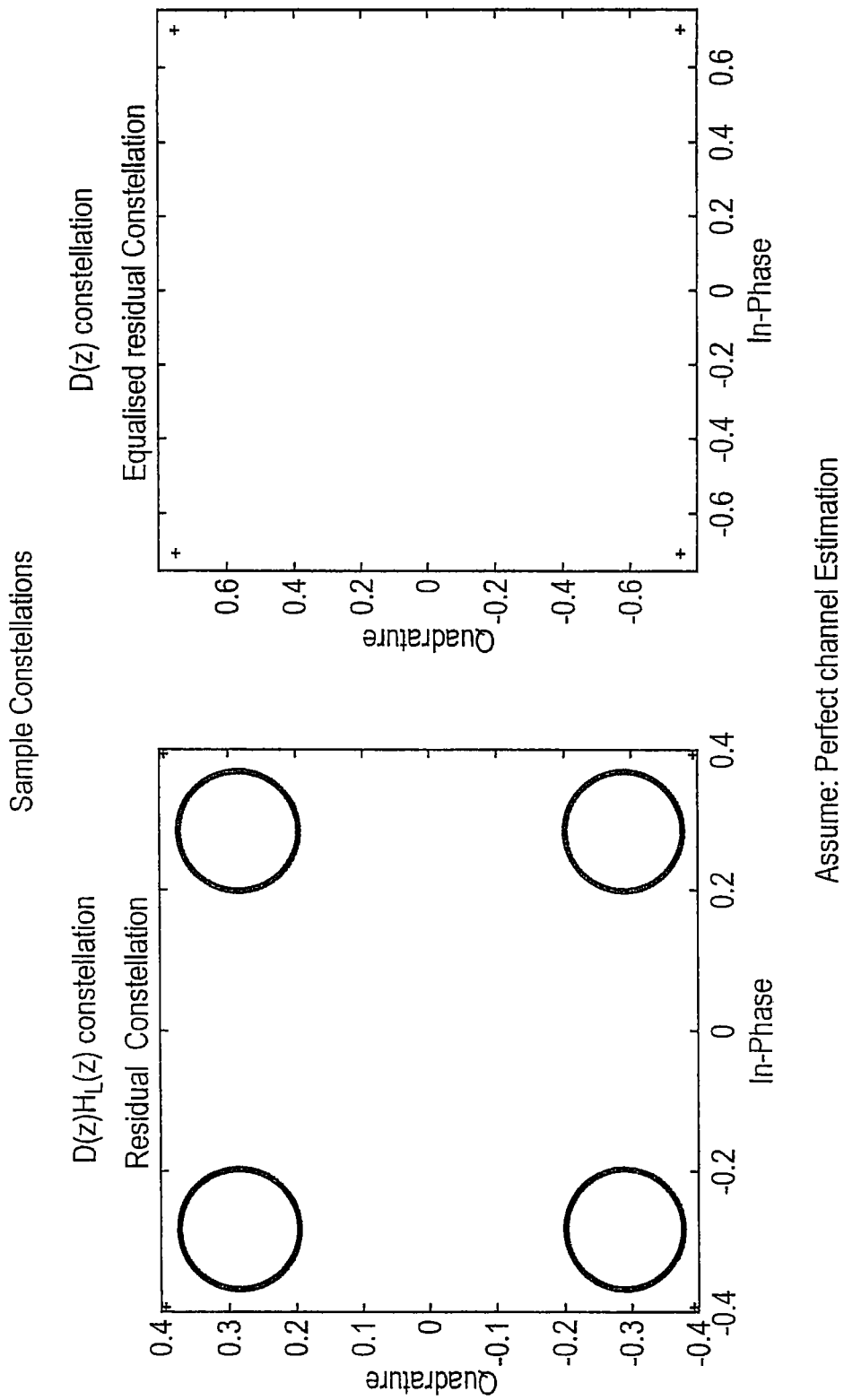
FIG. 13a is a schematic representation of a complex plane providing an illustration of signal constellation points after subtracting $S_{est}(z)[(H_l(z)+H_n(z)]$ and FIG. 13b is the result of dividing the signal represented in FIG. 13a by $H_l(z)$ assuming perfect channel estimation in which the local service insertion channel $H_l(z)$ is known exactly.

Thus, by cancelling the channel from the local service insertion base station $\hat{H}_l(z)$, a signal constellation diagram shown in FIG. 13b is formed from which the local service insertion data $\tilde{D}(z)$ can be recovered.

As will be appreciated from the above explanation in order to recover the local service insertion signal $\tilde{D}(z)$ it is necessary to estimate the local service insertion channel $\hat{H}_l(z)$ from the local service insertion base station which is separate from the channel from the national broadcast base station $H_n(z)$.

In a further embodiment, the computed $\tilde{D}(z)$ can be used to get a better estimate of $\hat{S}(z)$ by computing the following:

$$R(z) - \tilde{D}(z)H_l(z) = S(z)[H_n(z) + H_l(z)]$$

Then divide each side by $[H_n(z)+H_l(z)]$ and slice again for $\hat{S}(z)$. This kind of iteration may be continued many times to get a continuous improvement in the estimate of $\tilde{D}(z)$.

The above explanation has been provided to give an explanation of the general technique by which the data from the national broadcast signal and the local broadcast signal can be recovered. As given above a simple technique for cancelling the effects of a channel from a received signal is to divide the received signal by the estimate of the channel. However there are other equalisation techniques which can be used are some are presented below after the results section which includes generating a log likelihood ratio for the received data symbols. This example technique avoids a potential problem caused by cancelling by division if there are nulls in the frequency domain, which produces noise amplification as a result of dividing by zero.

Estimating Local Channel Using Local Pilots

According to the present technique the channel from the local service insertion base station $H_l(z)$ is estimated by including local service insertion pilot symbols on selected sub-carriers which are transmitting the local service insertion modulation symbols. Such an arrangement is shown in FIGS. 14a, 14b and 14c.

Figure 14A:
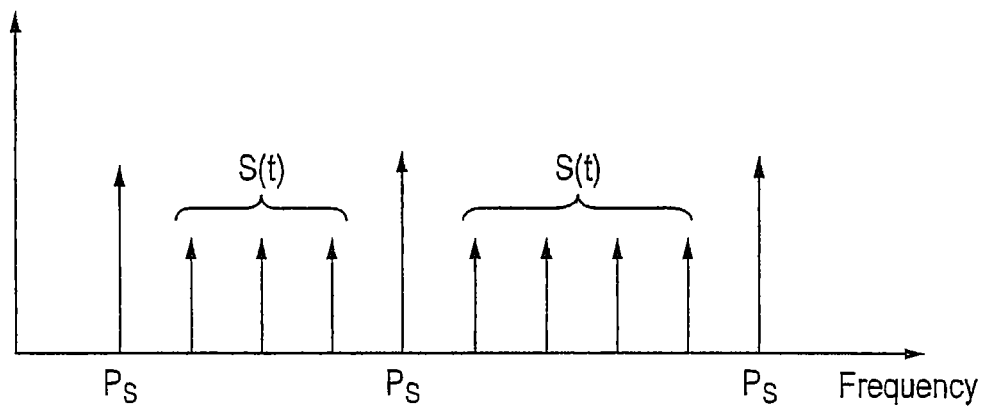
FIG. 14a is an illustrative representation of narrow band carriers of an OFDM symbol carrying the national broadcast signal.
Figure 14B:
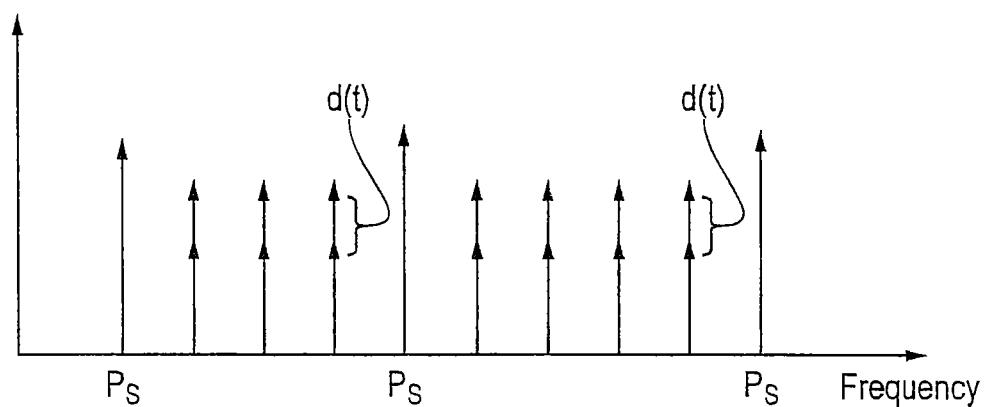
FIG. 14b is an illustrative representation of narrow band carriers of an OFDM symbol carrying both the national signal and the local service insertion signal.
Figure 14C:
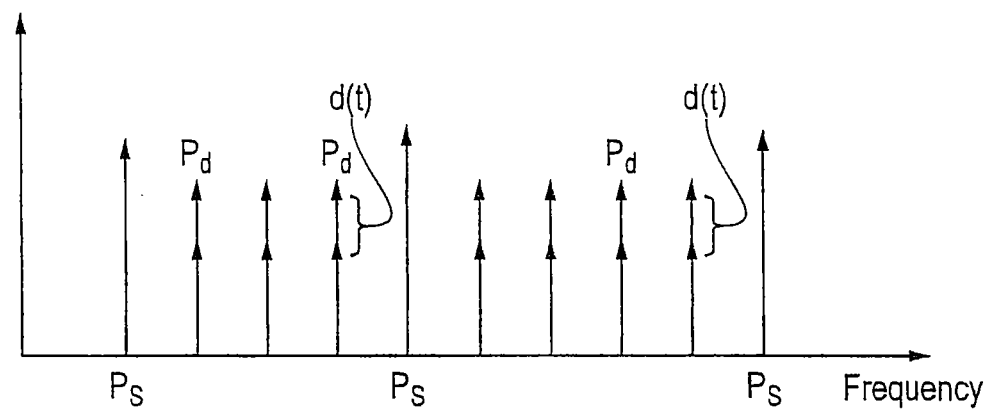
FIG. 14c is an illustrative representation of narrow band carriers of an OFDM symbol carrying the local service insertion signal, but adapted in accordance with the present technique to include local pilots.

In FIG. 14a an illustrative representation of an OFDM symbol in the frequency domain is provided showing a plurality of subcarriers which are then designated for conveying data according to the national broadcast signal s(t) and sub-carriers which are dedicated to transmitting pilot symbols Ps in accordance with a conventional arrangement. FIG. 14b provides an illustration of an OFDM symbol in which local service insertion symbols are introduced on top of the national broadcasting symbols using the hierarchical modulation scheme. However, in order to estimate the channel via which the local service insertion symbol is broadcast, it is necessary to select some of the subcarriers which are carrying data according to the local service insertion and replace these symbols with known symbols which will act as pilot symbols Pd. Such an arrangement is shown in FIG. 14c. Accordingly, it will be appreciated that the local service insertion pilots Pd can be transmitted in place of symbols which would be transmitted on subcarriers with higher order modulation symbols which would be arranged to carry the local service insertion data but arranging for these to be replaced by known symbols. Therefore these sub-carriers can convey a known symbol for the higher order modulation which can act as a pilot Pd.

However, as will be appreciated in order to transmit the local service insertion signal pilots Pd. it is necessary to accommodate the frequency interleaving which would be required for a conventional transmission of the local service insertion data.

As shown in FIG. 4, according to the present technique at the output of the frequency interleaver 54 for each data slice processor 50, 51, the data slice processors 50, 51 which include local service insertion data include a block 182 for inserting the local service insertion pilots Pd before generating the hierarchical modulation symbols as formed by the modulators shown in FIG. 4. The modulators 182 are arranged to map the data symbols onto modulation symbols in accordance with the hierarchical modulation scheme being used. Optionally, where a multiple input single output (MISO) scheme is being employed then further processing of the pilots is performed as illustrated by the MISO block 184. Following the MISO block 184, the pilot symbols are inserted on separate pilot subcarriers via the main pilot insertion unit 56 following which the framing unit 58 forms the OFDM symbols in the frequency domain in a combination with the OFDM block 70.

As shown in FIG. 4 at the output of the frequency interleaver 54 in a branch of the signal insertion data slice processor, the local service insertion data which is produced after the frequency interleaver 54 is fed to the local pilots insertion block 180 in which the data symbols for the local service insertion are replaced by the pilot symbols either by puncturing or for example where the modulation symbols which are to be used to carry the local service insertion of pilots are left vacant between data cells or are moved to accommodate the local service insertion pilots. As will be appreciated the local service insertion pilots Pd are pre-designated and so can either be reserved for local service insertion pilots or the data can be moved to accommodate the local service insertion pilots. Thus, the arrangement substantially as represented in FIG. 14c is produced at the output of the QAM modulator 182.

Figure 15:
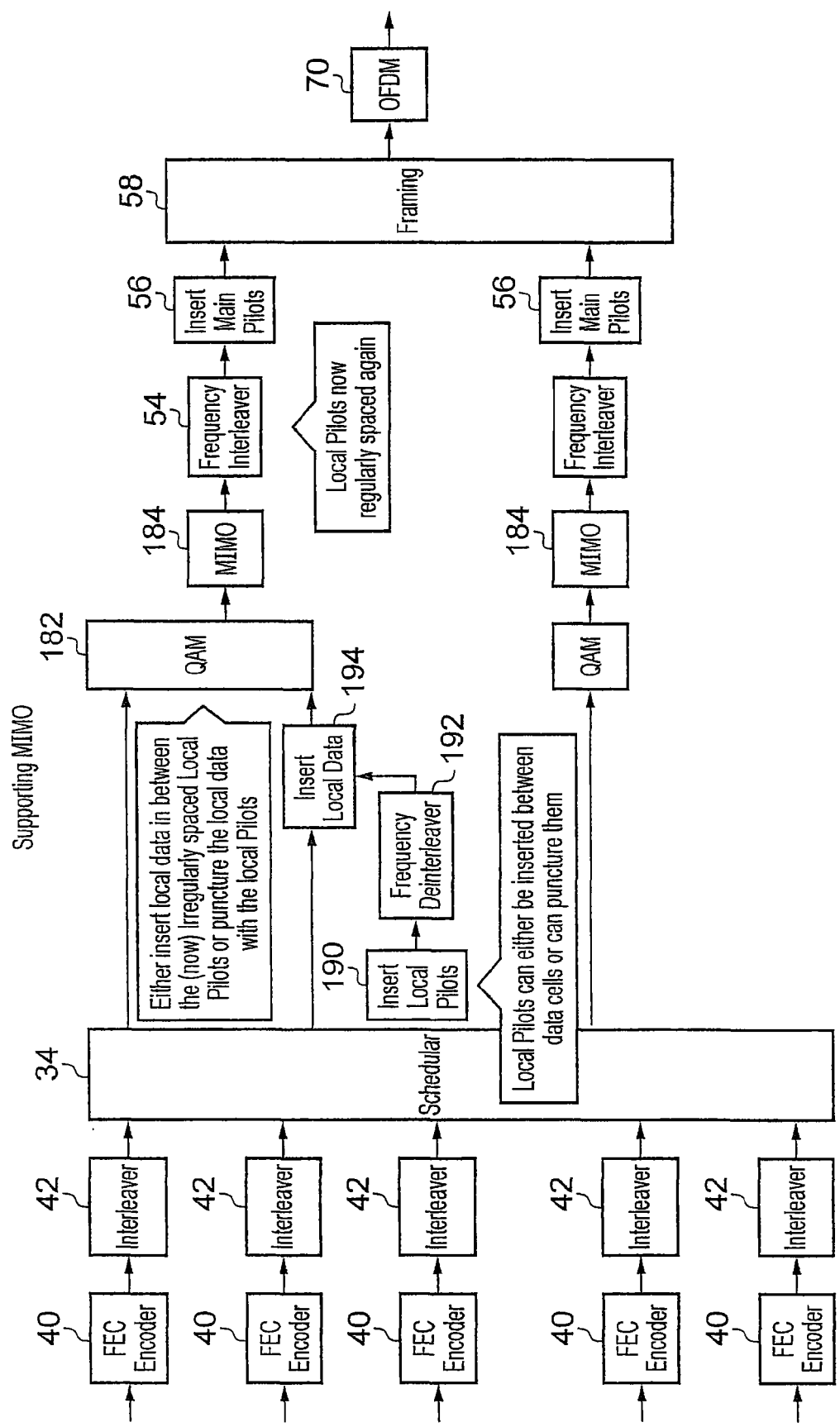
FIG. 15 is a schematic block diagram of a transmitter used in one or more of the base stations according to the present technique, which supports MIMO.
Figure 16:
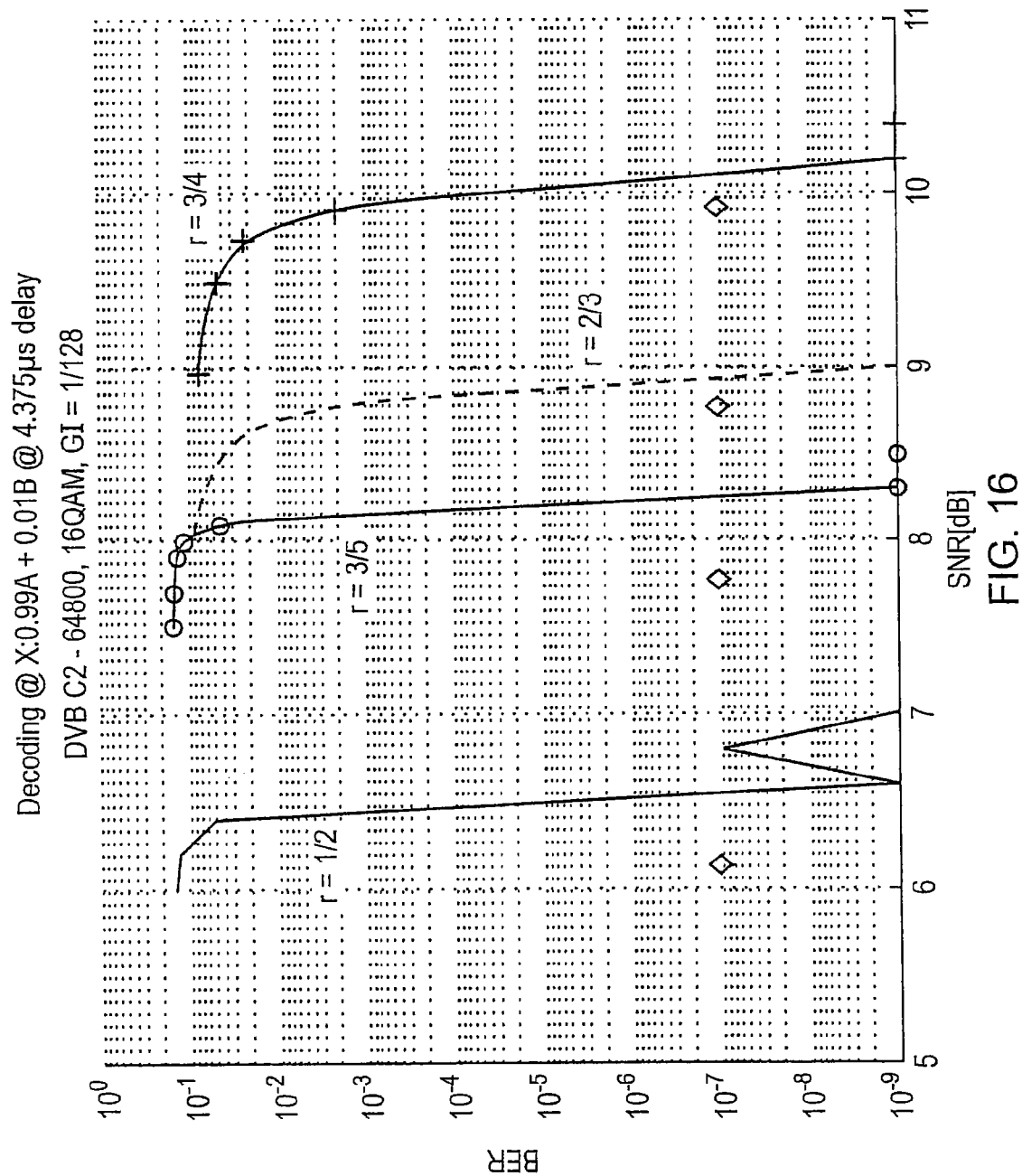
FIG. 16 is a graphical plot of bit error rate with respect to signal to noise ratio for example of a low density parity check (LDPC) coded OFDM transmitter-receiver chain, with error correction encoding of rate 1/2, 3/5, 2/3 and 3/4, a first modulation scheme of 16 QAM, a second modulation scheme of 64 QAM and in which the receiver is considered to be located within coverage area of cell A and to receive OFDM symbols with 99% of the signal power from base station A and 1% from base station B with the signal from B arriving at the receiver 4.375 us after the signal from base station A as illustrated by the example diagram shown in FIG. 6.

FIG. 15 provides a schematic block diagram which corresponds to the schematic block diagram shown in FIG. 4 except that FIG. 15 provides an example in which a multiple-input multiple-output (MIMO) transmission scheme is being used. However, a complication with the arrangement for a MIMO scheme is that the local service insertion pilots Pd, which are formed as part of the hierarchical modulation structure must be inserted before the frequency interleaver 192. This is because for a MIMO scheme, the pilots on each version of the OFDM signal to be transmitted are adapted with respect to each other and so each of the versions must be formed separately for each version. This applies for both the national broadcast modulation symbols and also the local service insertion symbols. Accordingly, it is not possible to combine the local service insertion pilots at the output of the frequency interleaver 54.

According to the present technique, in order to accommodate an arrangement in which the local service insertion pilots are formed in the signal before the frequency interleaver 54 then the local service insertion pilots are arranged with respect to the subcarriers which are conveying the hierarchical modulated data in a block 190 which is then fed to a frequency de-interleaver 192 which performs an inverse of the interleaving performed by the frequency interleaver 54. Thus, the pilot sub-carriers which include the local service insertion pilots Pd are arranged at their desired position and the frequency de-interleaver, de-interleaves these modulation symbols before the local service insertion data is applied by a local service insertion data block 194. At the output of the QAM modulator 182, the modulation symbols are formed and fed to a MIMO block 184. The frequency interleaver 54 then performs a mapping which is a reverse of the de-interleaver mapping performed by the frequency de-interleaver 192 so that at the output of the frequency interleaver 54, the local service insertion pilots are once again at the desired locations on the designated sub-carriers for the local service insertion pilots. Accordingly, OFDM symbols are formed with the local service insertion pilots Pd at their desired location. The main pilots Ps for the national broadcast signal are then added at the sub-carrier positions concerned via the main pilot insertion block 56 before the framing unit 58 and the OFDM unit 70 form the OFDM symbols as per a conventional arrangement.

Thus, according to the present technique the local service insertion pilots Pd are arranged at the desired location by first arranging for them to be disposed at their desired location and then forming an inverse of the interleaving using a de-interleaver so that when interleaved they are once again arranged at their desired location.

A received architecture which is arranged to recover the local service insertion data or the national broadcast data is described below with reference to FIG. 24.

Results

Figure 17:
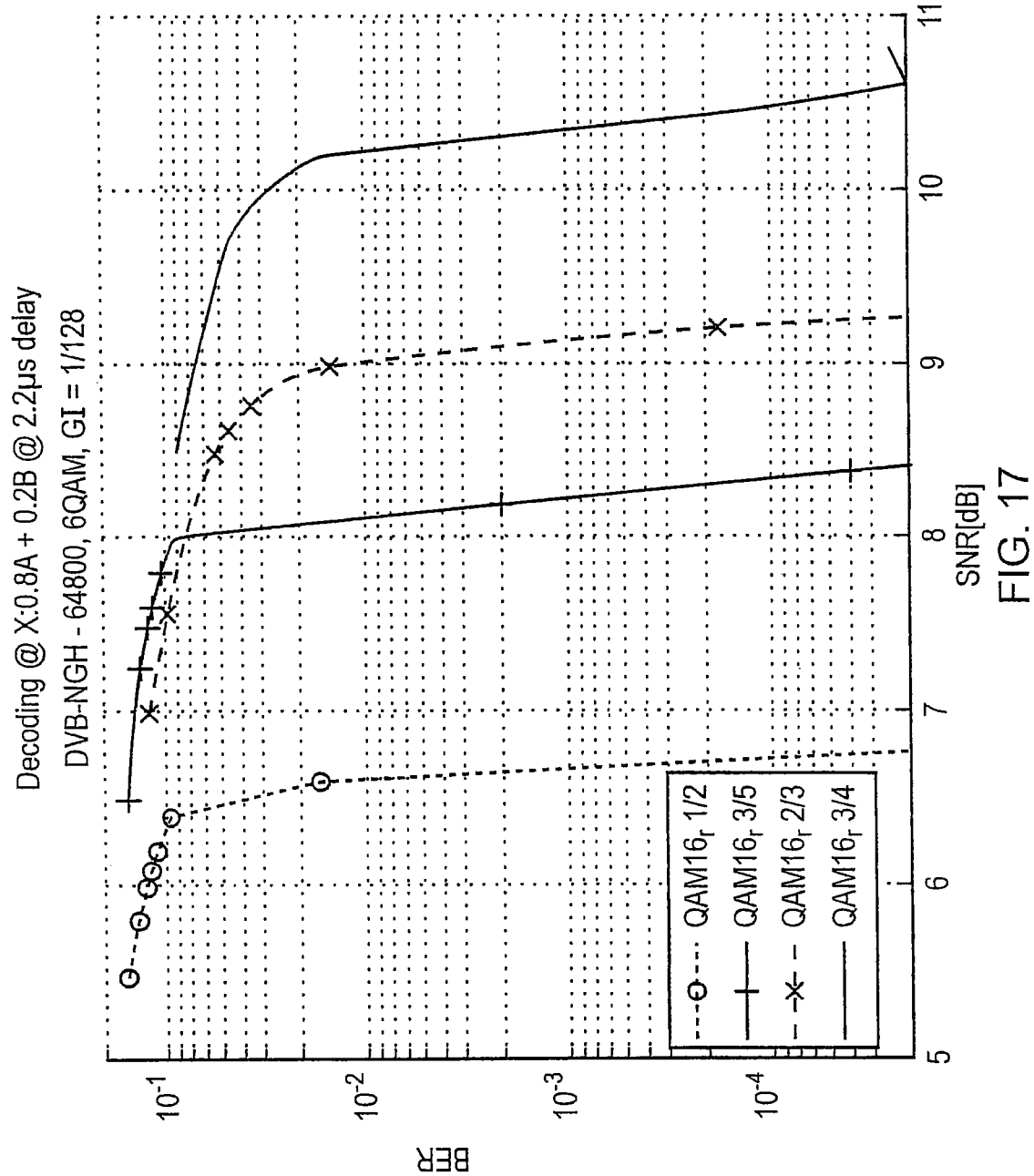
FIG. 17 is a graphical plot of bit error rate with respect to signal to noise ratio for the example of a LDPC coded OFDM transmitter-receiver chain, with error correction encoding of rate 1/2, 3/5, 2/3 and 3/4, a first modulation scheme of 16 QAM, a second modulation scheme of 64 QAM and in which the receiver is considered to be located within coverage area of cell A and to receive OFDM symbols with 80% of the signal power from base station A and 20% from base station B with the signal from B arriving at the receiver 2.2 µs after the signal from base station A as illustrated by the example diagram shown in FIG. 6.
Figure 18:
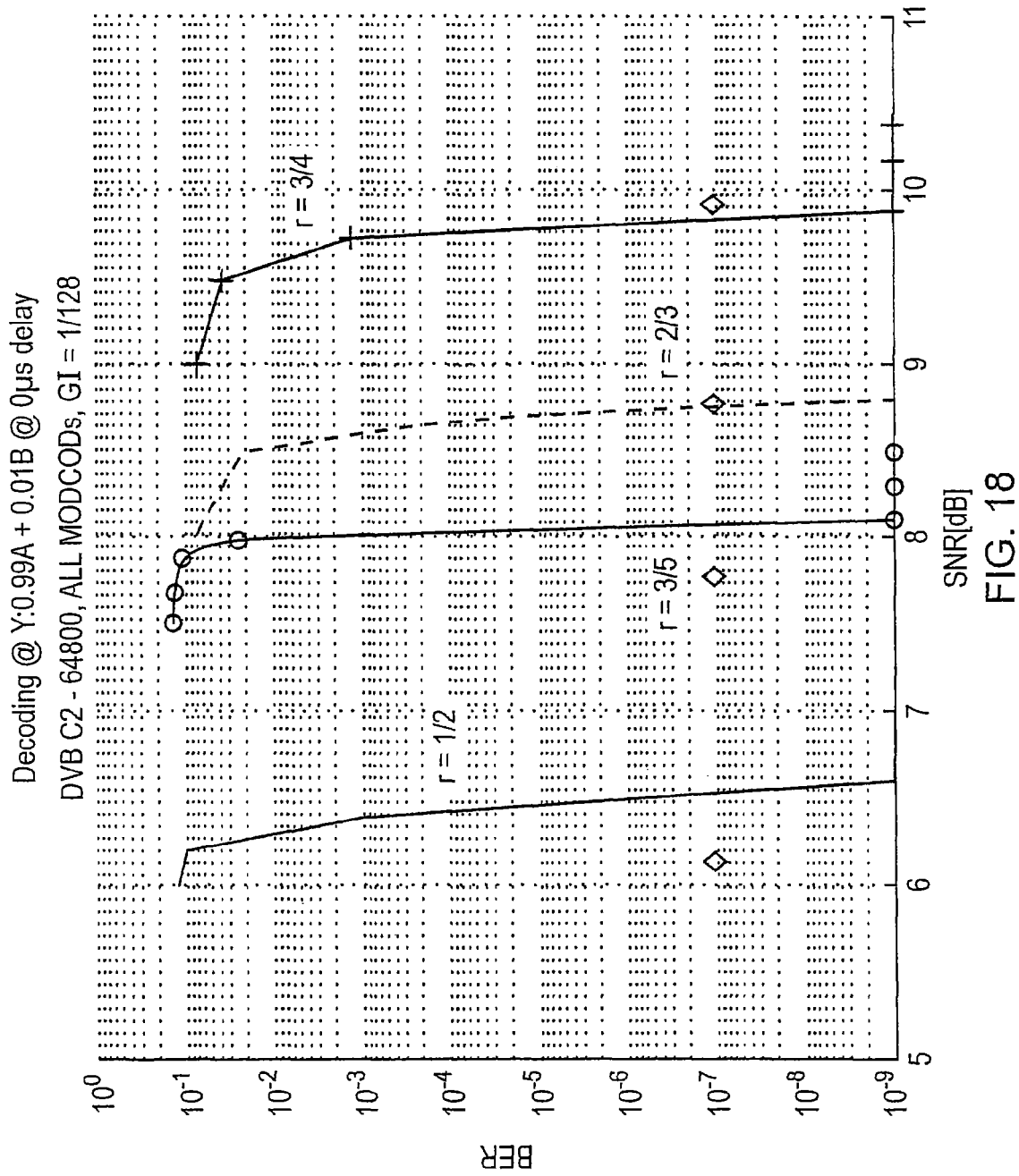
FIG. 18 is a graphical plot of bit error rate with respect to signal to noise ratio for example of a LDPC coded OFDM transmitter-receiver chain, with error correction encoding of rate 1/2, 3/5, 2/3 and 3/4, a first modulation scheme of 16 QAM, a second modulation scheme of 64 QAM and in which the receiver is considered to be located within coverage area of cell A and to receive OFDM symbols with 99% of signal power from base station A and 1% from base station B with zero delay between the signal times of arrival from the two cells illustrated by the example diagram shown in FIG. 6.
Figure 19:
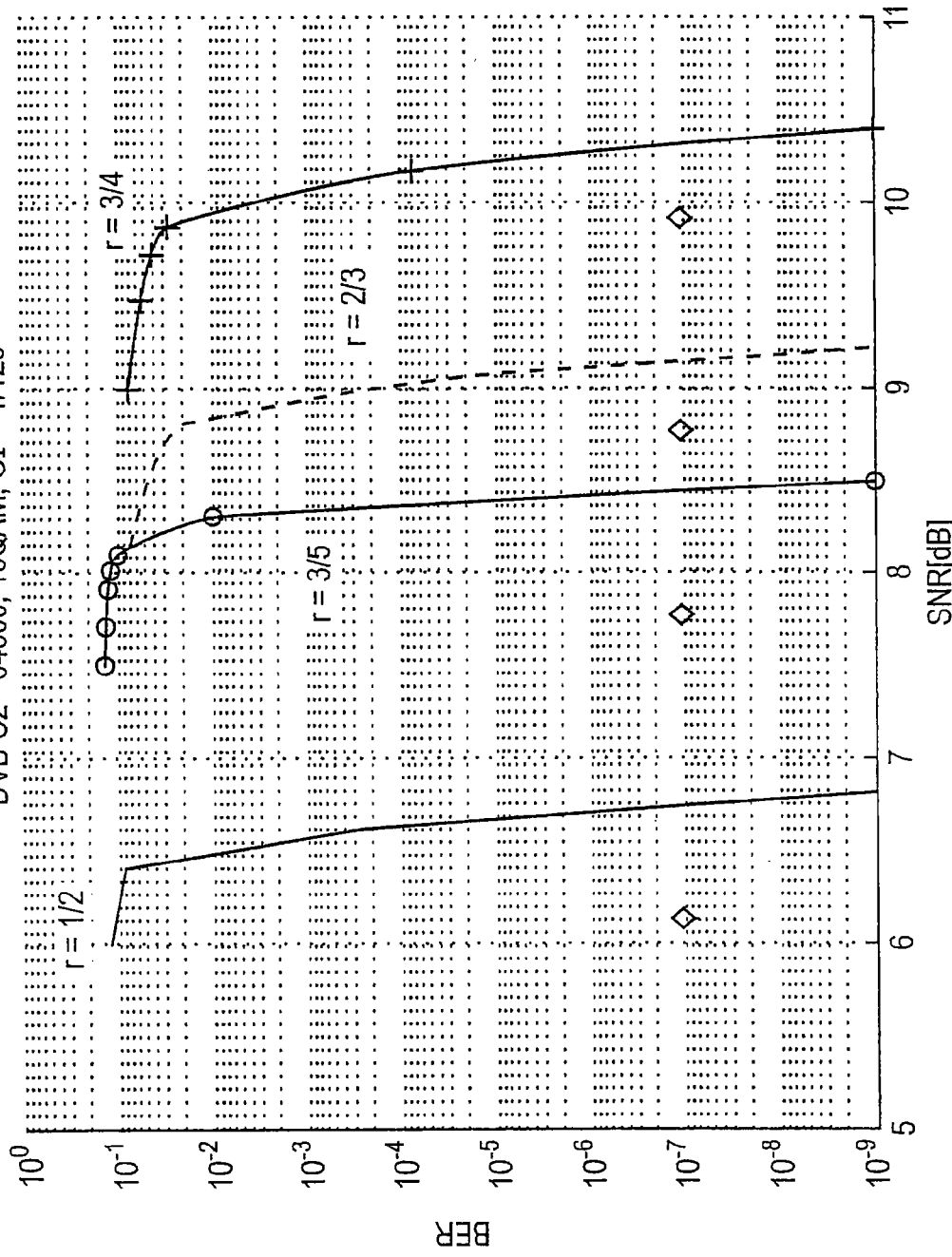
FIG. 19 is a graphical plot of bit error rate with respect to signal to noise ratio for example of a LDPC coded OFDM transmitter-receiver chain, with error correction encoding of rate 1/2, 3/5, 2/3 and 3/4, a first modulation scheme of 16 QAM, a second modulation scheme of 64 QAM and in which the receiver is considered to be located within coverage area of cell A and to receive OFDM symbols with 60% of signal power from base station A and 40% from base station B with zero delay between the signal times of arrival from the two cells illustrated by the example diagram shown in FIG. 6.
Figure 20:
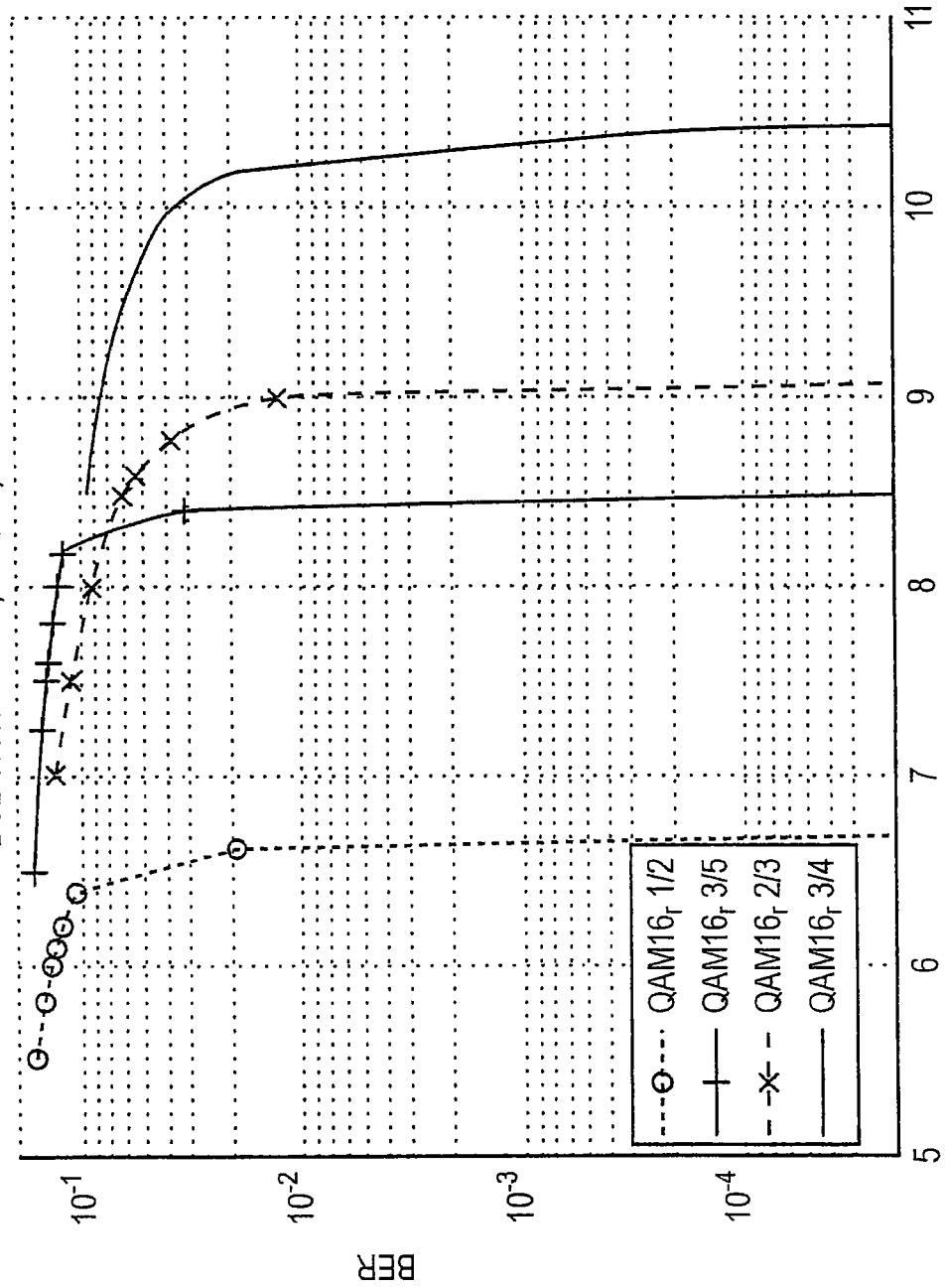
FIG. 20 is a graphical plot of bit error rate with respect to signal to noise ratio for example of a LDPC coded OFDM transmitter-receiver chain, with error correction encoding of rate 1/2, 3/5, 2/3 and 3/4, a first modulation scheme of 16 QAM, a second modulation scheme of 64 QAM and in which the receiver is considered to be located within coverage area of cell A and to receive OFDM symbols with 50% signal power from base station A and 50% from base station B with zero delay between the signal times of arrival from the two cells illustrated by the example diagram shown in FIG. 6.
Figure 21:
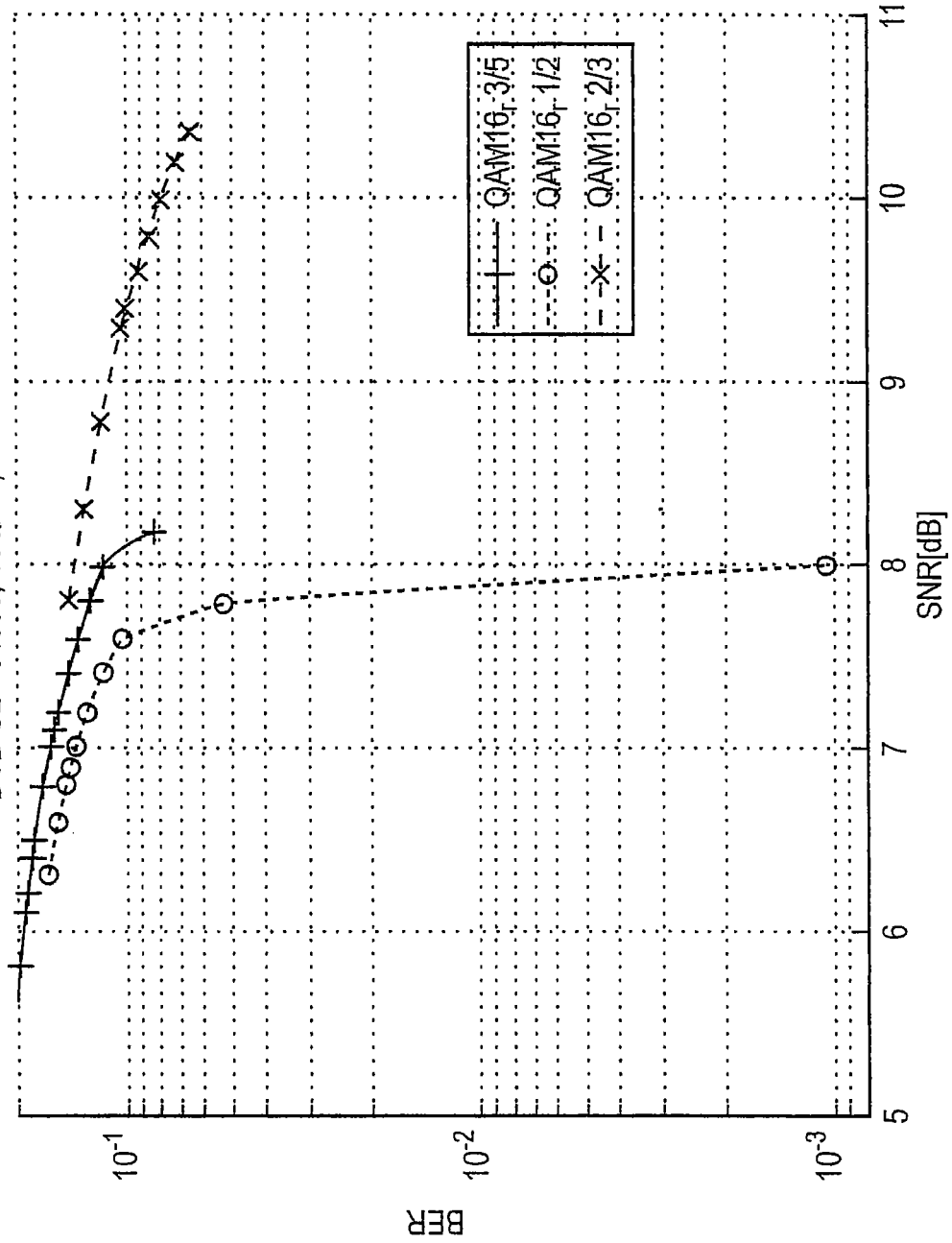
FIG. 21 is a graphical plot of bit error rate with respect to signal to noise ratio for example of a LDPC coded OFDM transmitter-receiver chain, with error correction encoding of rate 1/2, 3/5 and 2/3, a first modulation scheme of 16 QAM, a second modulation scheme of 64 QAM and in which the receiver is considered to be located within coverage area of cell B and to receive OFDM symbols with 10% of signal power from base station A and 90% from base station B with the signal from A arriving at the receiver 2.2 μs after the signal from base station B as illustrated by the example diagram shown in FIG. 6.

Various results are provided in FIGS. 16 to 21 for example transmitter-receiver chains operating with different forward error correction encoding rates of rate 1/2, 3/5, 2/3 and 3/4, and for a first modulation scheme of 16 QAM, a second modulation scheme of 64 QAM. FIGS. 16, 17, 18, 19, 20 and 21 provide examples for different ratios of the power from cell A and cell B. For FIG. 16 the fraction of the power of the received signal from cell A is 99% and 1% from cell B. The relative delay between time of arrival from cells A and B is 4.375 us. For FIG. 16 80% of the power is from cell A and 20% is from cell B with a 2.2 µs delay in time of arrival from cell B. FIG. 17 provides a 99% power from cell A and 1% of power from cell B at a 0 µs delay in relative time of arrival. FIG. 18 shows 60% of power from cell A and 40% of power from cell B at a 0 µs relative delay and FIG. 19 shows a 50% power from base station A and 50% power from cell B at a 0 µs relative delay. Finally, FIG. 20 shows results in a situation where 10% of the power is from cell A and 90% is from cell B with the signal from cell A arriving the receiver 2.2 µs after the arrival of the signal from cell B. As can be seen from the example in FIG. 21 there is insufficient signal to noise ratio to decode the 3/5, 2/3 rate codes. The required SNR should be that enough for the decoding of 64 QAM. With respect to each of the plots is shown a signal to noise ratio value which would correspond to a situation in which the transmitter for the same neighbouring cell was not transmitting the local service insertion data on the higher order modulation scheme 64 QAM for this example. Where appropriate some of the plots include points for each of the respective coding rates of 1/2, 3/5, 2/3 and 3/4 at a bit error rate of $10^{-7}$ as represented as a "◇". As shown in each case there is an increase in the signal to noise ratio required in order to reach the same bit error rate value. However the performance of the scheme would still seem to be acceptable.

Receiver

Figure 22:
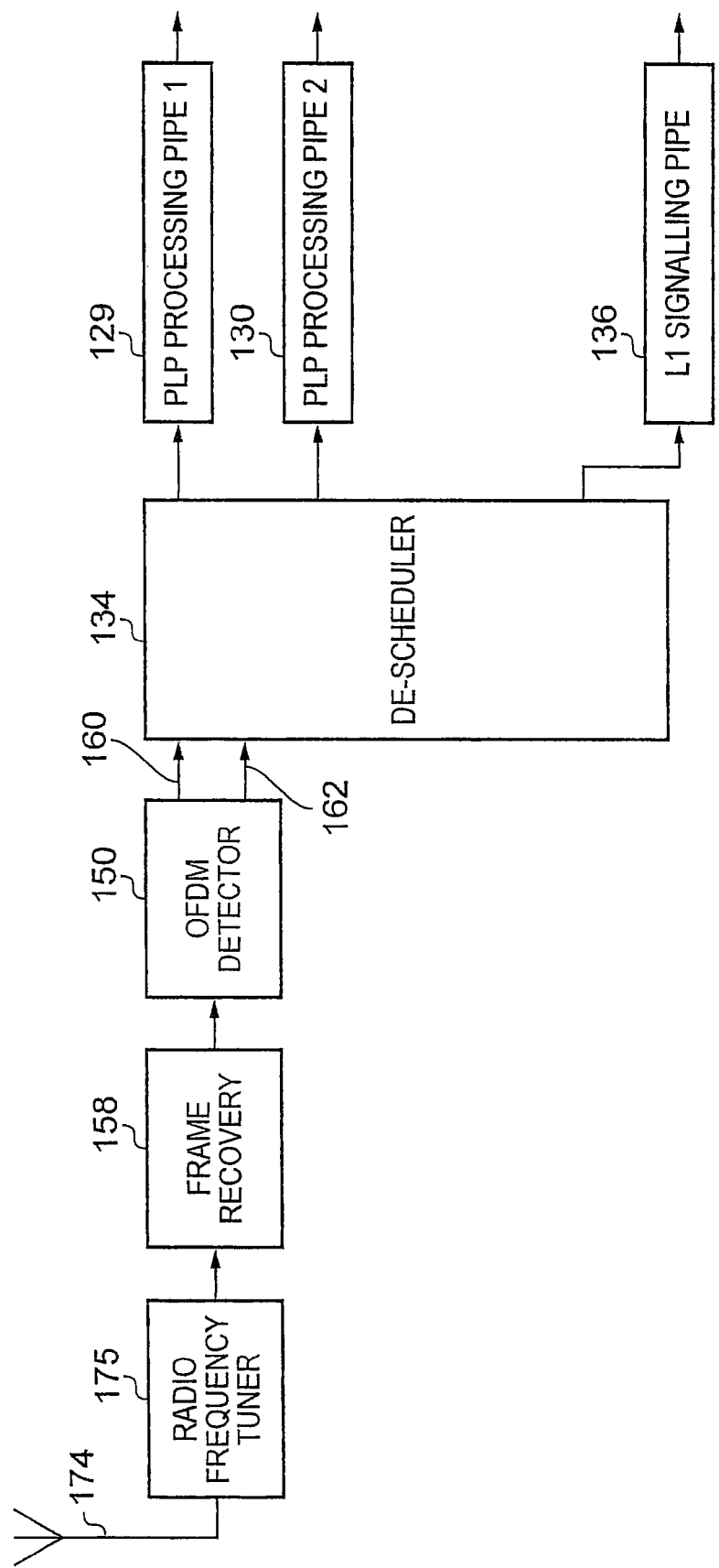
FIG. 22 is a schematic block diagram of a receiver according to an embodiment of the present technique.

A receiver which may form part of a mobile device for receiving the signals broadcast by any of the base stations of the network shown in FIG. 1 will now be described. An example architecture for a receiver for receiving any of the transmitted PLP pipes shown in FIG. 4 is provided in FIG. 22. In FIG. 22 a receiver antenna 174 detects the broadcast radio frequency signal carrying the OFDM signals which are fed to a radio frequency tuner 175 for demodulation and analogue to digital conversion of a time domain base band signal. A frame recovery processor 158 recovers time division multiplex physical layer frame boundaries and OFDM symbol boundaries and feeds each of the symbols for each of each physical layer frame to an OFDM detector 150. The OFDM detector 150 then recovers the national broadcast data and local service insertion data from the OFDM symbols in the frequency domain. The recovered national broadcast data and local service insertion data is then fed to a de-scheduler 134 which divides each of these symbols into the respectively multiplexed PLP processing pipes. Thus the de-scheduler reverses the multiplexing of applied by the scheduler 134 shown in FIG. 4 to form a plurality of data streams, which are fed respectively to PLP processing pipes 129, 130, 136. A typical receiver would have only a single PLP processing pipe as each PLP may carry a full broadcast service and this PLP processing pipe processes the data from any nation broadcast PLP or any local service insertion PLP. The processing elements forming part of the PLP processing pipes shown in FIG. 22 is shown in FIG. 23.

Figure 23:
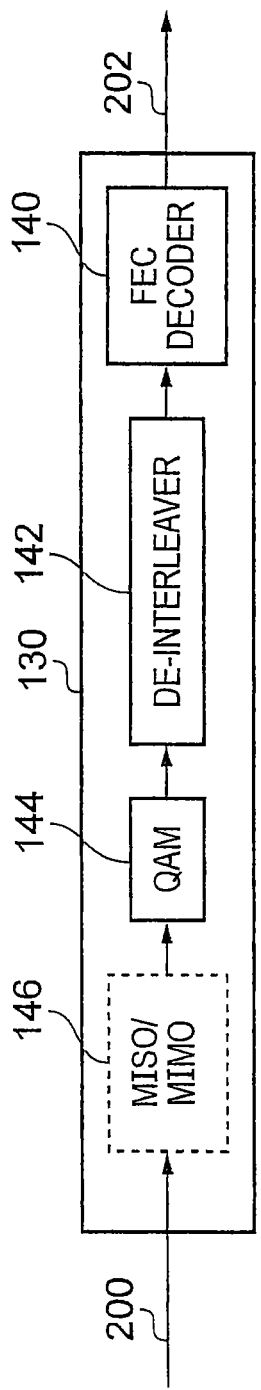
FIG. 23 is a schematic block diagram of a Physical Layer Pipe (PLP) processor which appears in the receiver shown in FIG. 22.

In FIG. 23 the first example PLP processing pipe 130 is shown to include a QAM demodulator 144, a de-interleaver 142 and a forward error correction decoder 140 which are arranged to substantially reverse the operations of the QAM modulator 44, the interleaver 42 and the FEC encoder 40 of FIG. 4. Optionally, the PLP processing pipe 130 may also include a MISO/MIMO detector 46 for performing multiple input multiple output or multiple input signal output processing. In operation therefore modulation symbols are received at an input 200 and fed to the MISO/MIMO processor 146 whose role is to decode the space-time code that was used at the transmitter thereby producing one stream of modulation symbols into a signal symbol stream which are then fed to the QAM demodulator 144. The QAM demodulator detects one of the constellation points in the QAM modulation scheme used and for each detected point recovers a data word corresponding to that point. Thus the output of the QAM demodulator 144 is a data symbol stream which is fed to the de-interleaver 142 for de-interleaving the data stream from a plurality of OFDM symbols or from within an OFDM symbol.

Since the data symbols have been encoded in the transmitter shown in FIG. 4, for example, using a low density parity check code, the symbols are decoded by the FEC decoder 140 to form at an output 202 base band data stream for the PLP.

In accordance with the present technique in some embodiments, the de-scheduler 150 is arranged to apply the TDMA frame in accordance with a cluster of base stations described above to recover OFDM symbols which have been modulated with the second modulation scheme and transmitted on one of the physical layer frames. Thus in accordance with the signal transmission arranged for the cell cluster the receiver tries the recovery of the OFDM symbols with sub-carriers modulated in accordance with the second modulation scheme in accordance with the frame timing applied by the transmitter in the base station. The information as to which physical layer frames carry hierarchical modulation for the given PLP is carried in the signalling PLP which the receiver first receives and decodes before any payload carrying PLP.

Equalising Received Single Frequency Signal

First Example

OFDM Detector

As explained above, according to the present technique the OFDM detector 150 shown in FIG. 22 is arranged to detect both the national signal S(z) and the local service signals D(z)

using the pilot signals transmitted with both the national and local signals and the additional pilots transmitted with the local signal. Two example implementations of the OFDM detector 150 will now be described, with reference to FIGS. 24 to 29.

Figure 24A:
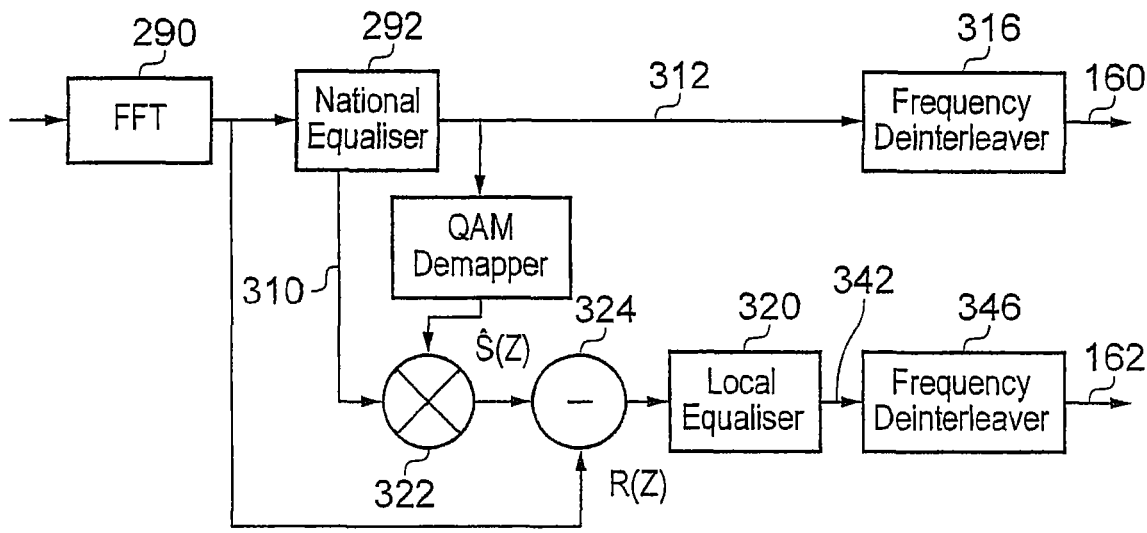
FIG. 24a is a schematic block diagram illustrating a first example of an OFDM detector adapted in accordance with a further example embodiment of the present invention.

FIG. 24a provides a representation of a schematic block diagram of a first example of the OFDM detector 150 shown in FIG. 22. This can be used for a SISO, MISO or MIMO scheme. In FIG. 24 a Fast Fourier Transform FFT block 290 converts the received signal from a time domain into the frequency domain. A national broadcast signal equaliser 292 then receives the frequency domain OFDM symbols and forms an estimate of the combined local service insertion channel and the national broadcast channel as well as the received national broadcast data. Blocks which make up the single frequency network equaliser 292 are shown in FIG. 24b.

Figure 24B:
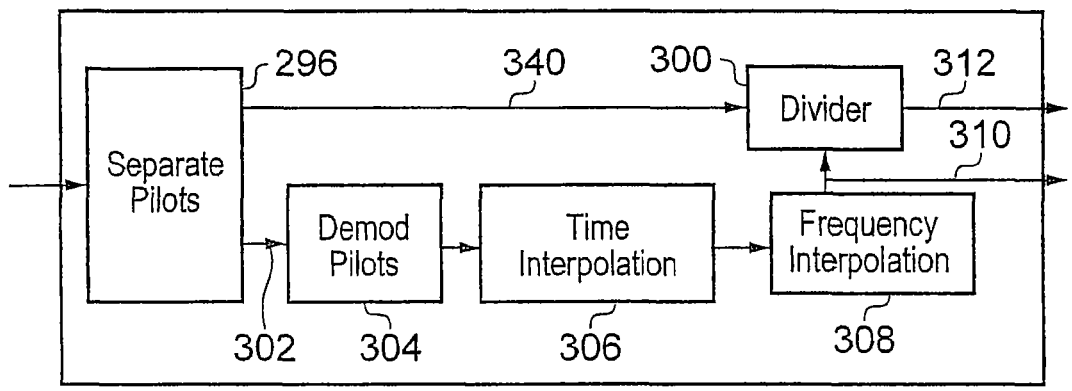

As shown in the FIG. 24b the single frequency network equaliser comprises a pilot separator 296 which separates the pilots from the received frequency domain signal. The frequency domain signal is fed at an output 298 of the pilot separator 296 to a divider circuit 300. From a second output 302 of the separator 296 the pilot sub-carriers are demodulated, interpolated in time by a time interpolation unit 304 and interpolated in frequency by a frequency interpolation unit 308 to form at an input 310 to the divider 300 an estimate of the combined national broadcast channel and the local service insertion channel $(H(z)_l+H_c(z))$ so that the output of the divider forms a signal representative of the national broadcast signal S(z) 312.

As shown in the receiver chain a de-mapper 314 then interprets the received modulation signals by slicing the modulation signalling about the real and imaginary plane to detect an estimate of the national broadcast signal $\hat{S}(z)$. The signal representative of the national broadcast signal S(z) 312 is then fed to a frequency de-interleaver 316 and then to a de-scheduler 134 as explained above for a general data recovery of the national broadcast signal.

Figure 24C:
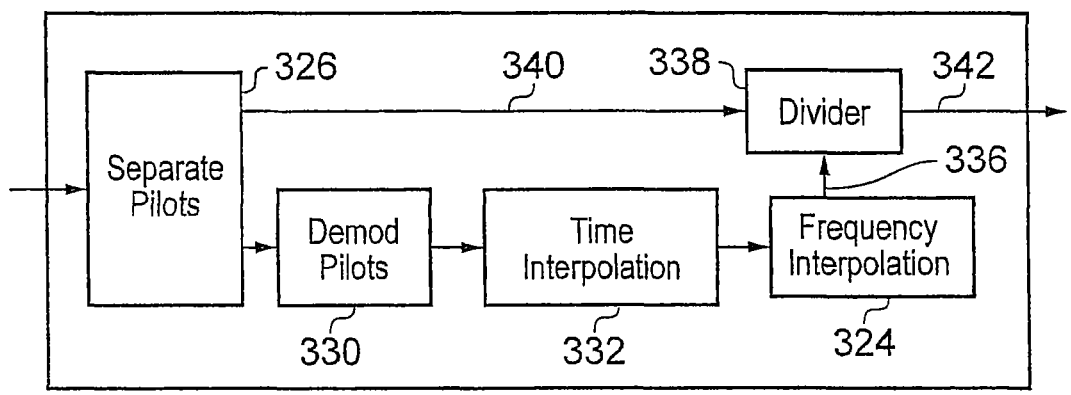

FIG. 24c provides an example implementation of a local equaliser 320. As shown in FIG. 24c, the detected combined local service insertion channel and national broadcast channel $(H(z)_l+H_c(z))$ are fed on an output 311 to a first input of a local equaliser 320. The estimate of the national broadcast symbols $\hat{S}(z)$ 315 is fed to a multiplier 322 which receives on a second input the estimate of the combined local service insertion channel and the national broadcast channel 310. A subtraction unit 324 then subtracts the multiplication of the estimate of the national broadcast symbols multiplied with the combined local service insertion and national broadcast channels from the received signal to form an estimate of the local service insertion symbols which are fed to a local equaliser 320. The internal structure of the local equaliser 320 is similar to that of the national broadcast signal equaliser. At the output of the local service insertion pilot separator 326 the pilot signals are fed on a output 328 to a pilot demodulator 330 and then to a time interpolation unit 332 followed by a frequency interpolation unit 334 which forms an estimate of the channel through which the local service insertion symbols have passed. The estimate of the local service insertion data is fed on an input 336 to divider circuit 338 which receives on a further input from the pilot separator 326, 340 the local service insertion symbols and forms at an output 342 an estimate of the local service insertion data symbols. A de-mapper 344 and frequency de-interleaver 346, then form an estimate of the data representing the locally inserted data which is fed to the de-scheduler 134. Thereafter, the data recovery of the locally inserted data corresponds to that shown with respect to the data pipe shown in FIG. 23.

As will be appreciated a further aspect of the present technique provides a first estimate of the national broadcast data, which is then refined, based on the determination of the local service insertion symbols to form a further refined estimate of the national broadcast symbols which may be further used to further calculate a refined estimate of the local service insertion symbols. Thus, an iterative feedback arrangement in the form of a turbo-demodulation can be formed to provide further improvements on the estimate of the received signals.

Second Example of the OFDM Detector

As will be appreciated by those familiar with equalisation techniques, the implementation of the single frequency network equaliser 292 and the local insertion equaliser 320 include a divider circuits 300, 338. Each of the divider circuits in the respective equalisers 292, 320 cancel the effect of the respective channels by division. For example in the single frequency equaliser 300, the channel H(z) is cancelled from the component of the signal which includes the data for the national signal S(z) by dividing in the frequency domain the national broadcast sign S(z) multiplied with the channel (convolved with the channel in the time domain) by the estimate of the channel H'(z) in order to recover the national broadcast signal. However a multi-path fading radio channel can produce nulls in the frequency response as a result of the multiple paths interfering destructively to cancel each other, thereby producing a zero component. As a result, a simple division of the received signal by the channel estimate can amplify noise as a result of a division by zero. A divide by zero (or a number close to zero) can therefore cause the estimate of a modulation symbol at a position corresponding to the channel sample which is zero or similar to produce a maximum of the complex real and imaginary terms. As a result information which the modulation symbol carries, the modulating data will be lost. The second example of the OFDM detector 150 is therefore arranged to obviate this technical problem by considering the effect of the channel in the generation of the log likelihood function at the de-mapper instead of the divide by zero in order to recover the data from the received signal. The equaliser therefore performs a detection of the data using a minimum mean squared error equalisation technique. The second example of the OFDM detector 150 is shown in FIGS. 25, 26, 27 and 28.

Figure 25:
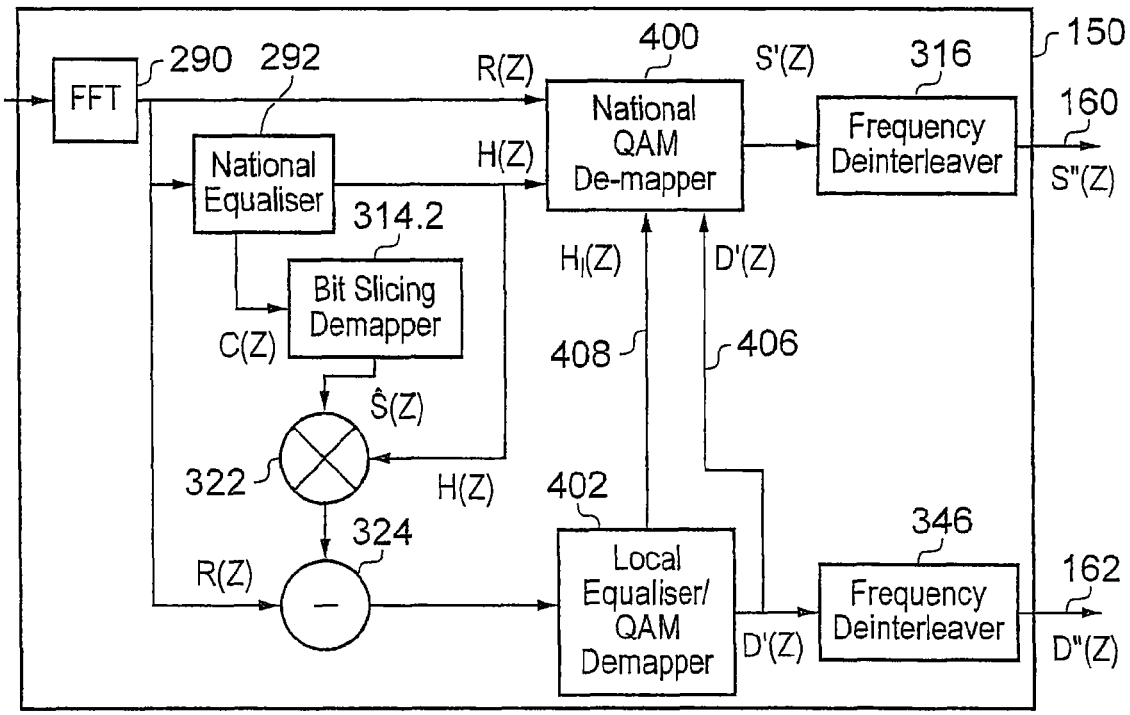
FIG. 25 is a schematic block diagram of a second example of an OFDM detector forming part of the receiver of FIG. 22 adapted in accordance with a further example embodiment of the present invention.

FIG. 25 provide the second example of the OFDM detector 150 which corresponds to the example shown in FIG. 24a and so only the differences will be described here for brevity. An FFT processor 290, frequency de-interleavers 316, 346, a national signal equaliser 292.2, the multiplier 322 and the subtraction circuit 324 operate to perform corresponding functions to those of the correspondingly number units shown in FIG. 24a described above. The differences from the first example therefore reside in a national QAM de-mapper 400, the bit slicing de-mapper 314.2 and a local equaliser/QAM de-mapper 402.

Figure 26:
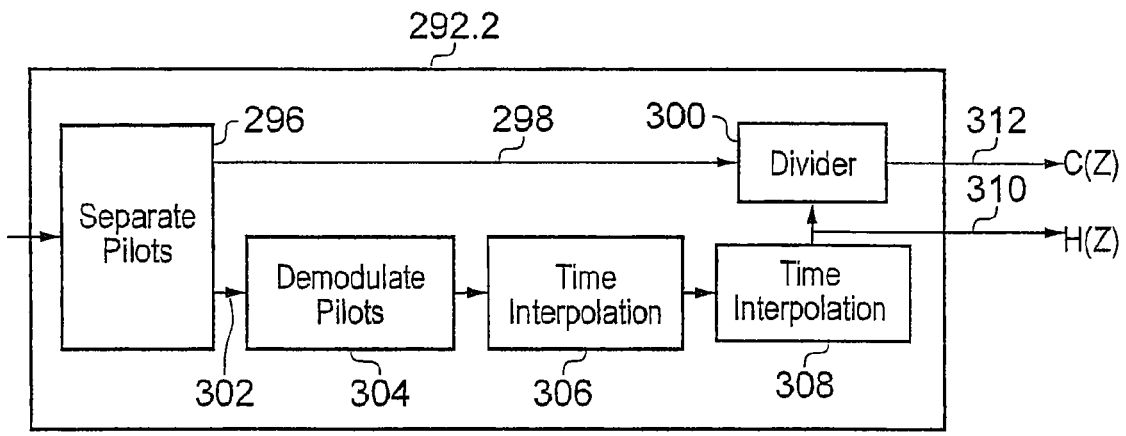
FIG. 26 is a schematic block diagram of an equaliser of national broadcast modulation symbols of the OFDM detector shown in FIG. 25.

As with the first example, the FFT processor 290 recovers a frequency domain version of the received OFDM symbol, and feeds the OFDM symbol to a first national equaliser 292.2. The national equaliser 292.2 is shown in FIG. 26 and operates to generate an estimate of the combined channel H(z) through which the national broadcast signal and the local broadcast signal were received. The national equaliser 292.2 operates as the single frequency equaliser 292 shown in FIG. 24b to generate an estimate of the national broadcast signal $\hat{S}(z)$ by dividing the received signal by the estimated channel. The national equaliser 292.2 therefore operates in correspondence with the national equaliser shown in FIG. 24b, but otherwise operates in the same way.

The first estimate of the national signal Ŝ(z) is fed to a bit slicing processor, which recovers a first estimate of the data convey by the national signal Ŝ(z) using the bit slicing processor 314.2, which operates in the same way as the QAM demapper 314 shown in FIG. 24c. Correspondingly, the multiplier 322 and the subtraction circuit 324 operates as shown in FIG. 24c to form at an input to the local equaliser/QAM demapper 404, a signal which corresponds to the local signal convolved with the local channel (D(Z)Hl(z)). Therefore according to the operation of the FFT processor 290, the first national equaliser 292, the bit slicing demapper 314.2, the multiplier 322 and the subtraction circuit 324, the following are produced at the respective outputs of these circuits:

The receive signal at the output of the FFT processor 290 is:

$R(z)=S(z)[H_I(z)+H_N(z)]+D(z)H_I(z)$, in which $H(z)=[H_I(z)+H_N(z)]$

The output from the first national equaliser 292.2 on an output channel 310 is then:

$H(z)=[H_I(z)+H_N(z)]$

Whereas on the output 312 from the first national equaliser, the result of dividing the received signal by the channel H(z) produces:

$$C(z) = S(z) + \frac{D(z)H_I(z)}{H(z)}$$

Therefore the output 315 of the bit slicing demapper, which process C(z) by slicing about the real and imaginary planes produces S'(z). Accordingly, R'(z) is reconstituted at the output of the multiplier circuit 322 according to:

$R'(z)=S'(z)H(z)+D(z)H_I(z)$

So that the output of the subtraction circuit 324 becomes:

$R'(z)-S'(z)H(z)=D(z)H_I(z)$

Figure 27:
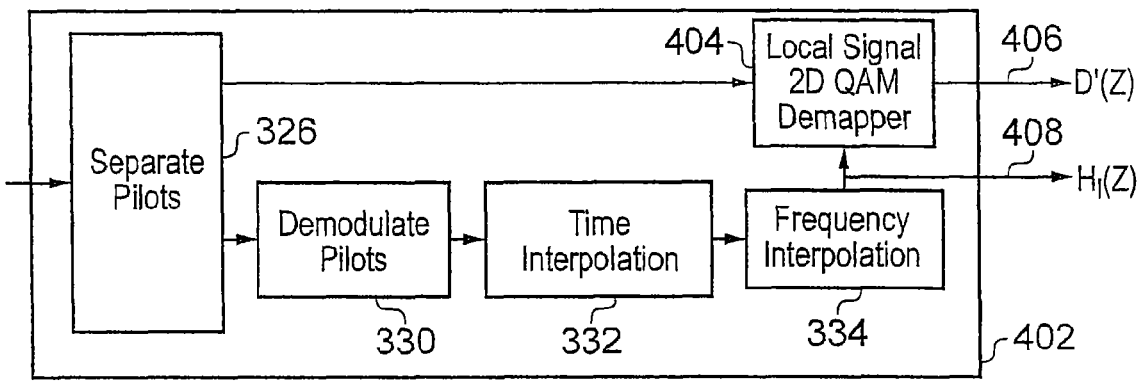
FIG. 27 is a schematic block diagram of an equaliser/demapper for recovering local service data symbols of the OFDM detector shown in FIG. 25.

As shown in FIG. 25, the local equaliser/QAM demapper 402 operates to recover the local signal D(z) and the H'$_I$(z) using the known local signal pilots within D(z). The local equaliser 402 is shown in more detail in FIG. 27. As shown in FIG. 27, the local equaliser 402 is arranged to generate the estimate of the local channel H'$_I$(z), using the pilot separator 326, the demodulator 330, the time interpolation circuit 332 and the frequency interplotation circuit 334 as explained above with reference to FIG. 24c. However, in FIG. 27, the local equaliser 402 includes a local 2D QAM demapper, which operates to generate an estimate of the local signal D'(z), as explained in the following paragraphs, by using a log likelihood function rather than a division circuit. This is achieved by using a 1D or a 2D demapper of D(z)H$_I$(z) using the estimated H'$_I$(z) as the channel transfer function. This gives estimate D'(z).

Minimum Mean Square Error Local Equaliser

The local equaliser 320 shown in FIG. 24c generates the estimate of the local signal D'(z), by cancelling the effects of the local signal channel using a divider circuit and then de-maps the modulation symbols of the local signal which are produced at the output of the divider circuit 338. In contrast, the local equaliser/demapper 402 uses a 2D or 1D QAM demapper, which combines the estimate of the channel H'$_I$(z) and a sample of the received local signal D(z)H$_I$(z) to produce a log likelihood ratio for each of the estimated modulation symbols. The log likelihood ratios (LLR) of the modulation symbols can then be used in a subsequent error correction decoder which utilises soft decision information to recover the data communicated from the local signal. As such, because the local equaliser/demapper does not perform a division of the received local signal by the estimate of the local channel, the divide by zero problem explained above is avoided or at least reduced. The operation of the local signal demapper 404 which generates a log likelihood ratio for each estimate modulation symbol or cell of the OFDM signal is explained as follows:

Log Likelihood Demapper

Let a received modulation symbol estimate or cell be designated as $r=I_d+jQ_d$. The demapper is arranged in operation to calculate a soft bit in the form of a log-likelihood ratio (LLR) for each of the bits carried by the cell. The LLR for the bit at position i of the constellation label ($b_i$) can be computed as:

$$L(b_i) = \ln\left[\frac{P(b_i = 1 \mid r)}{P(b_i = 0 \mid r)}\right]$$

where:

$$P(b_i = k \mid r) = \sum_{x \in C(k,i)} P(x \mid r)$$

for $k = 0, 1$.

where C(k,:) is the set of constellation points for which the value ($b_i$) of the bit at position i is k. Thus with 16 QAM for example: C(0,3)={0000, 0001, 0010, 0011, 0100, 0101, 0110, 0111} i.e. the set of constellation labels for which the MSB ($b_3$) is zero.

In its most general form:

$$P(x \mid r) = \frac{1}{\sigma_I\sqrt{2\pi}}\exp\left(-\frac{|I_d - \rho_I I_x|^2}{2\sigma_I^2}\right) * \frac{1}{\sigma_Q\sqrt{2\pi}}\exp\left(-\frac{|Q_d - \rho_Q Q_x|^2}{2\sigma_Q^2}\right)$$

Where σ is the noise standard deviation of $I_d$ and $Q_d$ accordingly and the ρ are the respective channel fading coefficients for the I and Q channels. Note that in general, the σ and ρ can be different if the $I_d$ and $Q_d$ come from different OFDM cells because of the use of rotated constellations, for example. When rotated constellations are not used, the pairs of σ and ρ are of course the same and simplify things considerably.

The multiplier terms before the exponentials only scale and so the LLR is proportional to:

$$L(b_i) = \ln\left[\frac{\sum_{x \in C(1,i)} \exp\left(-\frac{|I_d - \rho_I I_x|^2}{2\sigma_I^2} + \frac{|Q_d - \rho_Q Q_x|^2}{2\sigma_Q^2}\right)}{\sum_{x \in C(0,i)} \exp\left(-\frac{|I_d - \rho_I I_x|^2}{2\sigma_I^2} + \frac{|Q_d - \rho_Q Q_x|^2}{2\sigma_Q^2}\right)}\right]$$

This can be simplified using the max-log approximation which postulates that:

$$\ln\left[\sum_{k=1}^{L} \exp(a_k)\right] = \max(a_k)$$

It also follows that:

$$\ln\left[\sum_{k=1}^{L} \exp(-a_k)\right] = \min(a_k)$$

Therefore, $$L(b_i) = \min_{x \in C(0,i)}\left[\frac{|I_d - \rho_I I_x|^2}{2\sigma_I^2} + \frac{|Q_d - \rho_Q Q_x|^2}{2\sigma_Q^2}\right] - \min_{x \in C(1,i)}\left[\frac{|I_d - \rho_I I_x|^2}{2\sigma_I^2} + \frac{|Q_d - \rho_Q Q_x|^2}{2\sigma_Q^2}\right]$$

Which represents a so-called 2D de-mapper, in which $$\sigma^2 = \frac{1}{2^m \varphi} \sum_x [I_x^2 + Q_x^2]$$

where $\varphi$ is the linear SNR/cell computed for the relevant cell in the equalised/demapper signal and $m = \frac{1}{2}\log_2(M)$ being the number of bits conveyed per constellation axis. Note that for rotated constellations the $\varphi$ are different for I & Q and so the $\sigma$ will also be different. The summation in the above equation for $$\sigma^2 = \frac{1}{2^m \varphi} \sum_x [I_x^2 + Q_x^2]$$

is the well known average energy per symbol of the particular QAM constellation.

The operation of the local equaliser/de-mapper therefore performs the following computations for each input cell $r = I_d + jQ_d$:

1. For each point $x = I_x + jQ_x$ in the constellation, calculate the distances $|I_d - I_x|^2$ and $|Q_d - Q_x|^2$ scaled by the relevant noise terms. If this is done in a brute force fashion, M of these would be needed for M-QAM. However, if these are calculated per contour of the relevant QAM then only M/2 subtractions and square operations are needed followed by M additions.
2. For bit position i in the constellation label, find out for each constellation point x, if $b_i$ is one or zero and consider if the I&Q distance sum of x from r (computed in step 1) is the minimum for the relevant set. In practice, for each constellation type and for each bit position i the indices to the points which are members of the sets C(0,i) and C(1,i) can be pre-identified and tabulated.
3. Once the two minima are found, perform the subtraction in the equation to get $L(b_i)$.

On the other hand, the 2D-demapper LLR function can be expanded into:

$$L(b_i) = \min_{x \in C(0,i)}\left[\frac{I_d^2 - \rho_I^2 I_x^2 - 2I_d\rho_I I_x}{2\sigma_I^2} + \frac{Q_d^2 + \rho_Q^2 Q_x^2 - 2Q_d\rho_Q Q_x}{2\sigma_Q^2}\right] - \min_{x \in C(1,i)}\left[\frac{I_d^2 + \rho_I^2 I_x^2 - 2I_d\rho_I I_x}{2\sigma_I^2} + \frac{Q_d^2 + \rho_Q^2 Q_x^2 - 2Q_d\rho_Q Q_x}{2\sigma_Q^2}\right]$$

Each component is minimised when their respective:

$$\frac{I_d \rho_I I_x}{2\sigma_I^2} + \frac{Q_d \rho_Q Q_x}{2\sigma_Q^2}$$

are maximised. Thus, another strategy is to compute and maximise only these terms for each set C(k,:), and to compute the full LLR only for the constellation points that produce these maxima.

1-D Demapper

The Demapper can be significantly simplified into 2×1-D Demappers but with some loss in performance. In any uniform QAM half the bits for each constellation point are completely determined by one of the axis, as illustrated for example in FIG. 28. For the example shown in FIG. 28, which corresponds to the example of 16 QAM we can see that $\{b_0, b_2\}$ are determined only by the real axis whilst $\{b_1, b_3\}$ are determined only by the imaginary axis. The mapping is tabulated as in the table below:

| 16 QAM bits versus axis amplitudes | | | |
|---|---|---|---|
| Bit Position | Value | Real Amplitude | Imaginary Amplitude |
| 0 | 0 | +1, +3 | |
|   | 1 | −1, −3 | |
| 1 | 0 | | +1, +3 |
|   | 1 | | −1, −3 |
| 2 | 0 | −3, +3 | |
|   | 1 | −1, +1 | |
| 3 | 0 | | −3, +3 |
|   | 1 | | −1, +1 |

This means that the soft decision values for bits $\{b_1, b_3\}$ can be derived only from the LLR of amplitudes of the imaginary axis whilst those for $\{b_0, b_2\}$ can be derived only from the LLR of amplitudes of the real axis. Thus the LLR calculation is simplified to the equation below, which would provide a 1D demapper:

$$P(x \mid r) = \frac{1}{\sigma_I \sqrt{2\pi}} \exp\left(-\frac{|I_d - \rho_I I_x|^2}{2\sigma_I^2}\right) \text{ or }$$

$$P(x \mid r) = \frac{1}{\sigma_Q \sqrt{2\pi}} \exp\left(-\frac{|Q_d - \rho_Q Q_x|^2}{2\sigma_Q^2}\right)$$

This equation is difference dependent on whether the LLR for either $\{b_0, b_2\}$ or $\{b_1, b_3\}$ are being calculated respectively. Thus taking $\{b_0, b_2\}$:

$$L(b_i) = \ln\left[\frac{\sum_{x \in A(1,i)} \exp\left(-\frac{|I_d - \rho_I I_x|^2}{2\sigma_I^2}\right)}{\sum_{x \in A(0,i)} \exp\left(-\frac{|I_d - \rho_I I_x|^2}{2\sigma_I^2}\right)}\right]$$

where A(k,:) is the set of I-axis amplitudes for which $b_i=k$. Then after the max-log approximation:

$$L(b_i) = \min_{x \in A(0,i)} \left[ \frac{|I_d - \rho_I I_x|^2}{2\sigma_I^2} \right] - \min_{x \in A(1,i)} \left[ \frac{|I_d - \rho_I I_x|^2}{2\sigma_I^2} \right]$$

As before, each component is minimised when:

$$\frac{I_d \rho_I I_x}{2\sigma_I^2}$$

is maximised. The same analysis can be done for the imaginary axis.

Thus in an alternative embodiment the local equaliser/demapper 402 can be arranged to perform either the 2D-demapper calculation explained above, or the 1-D demapper which typically is less complex than the 2-D demapper particularly as the number of constellation points in each of the sets A(0,:) and A(1,:) is rather low, which for the example of 16 QAM requires only two elements in each case as seen in Table 3. The max-log approximation is thus often dispensed with for lower order modulation schemes and the LLR derived using piece-wise linear approximations of the exponential functions in the 1D-demapper equation since the number of terms to sum is limited.

Second National Equaliser/De-mapper

Figure 29:
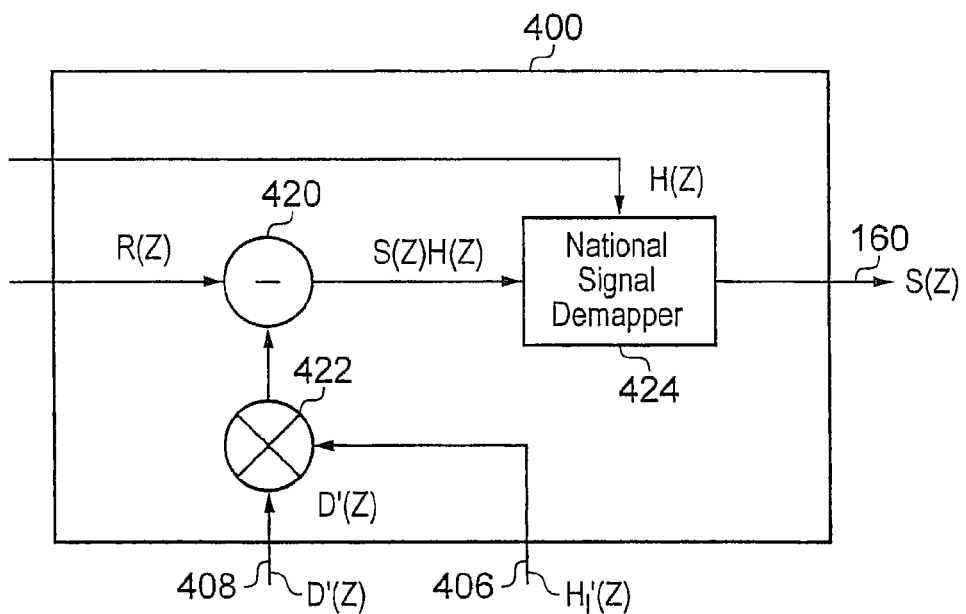
FIG. 29 is a schematic block diagram of an equaliser/demapper for recovering national broadcast data symbols of the OFDM detector shown in FIG. 25.
Figure 28:
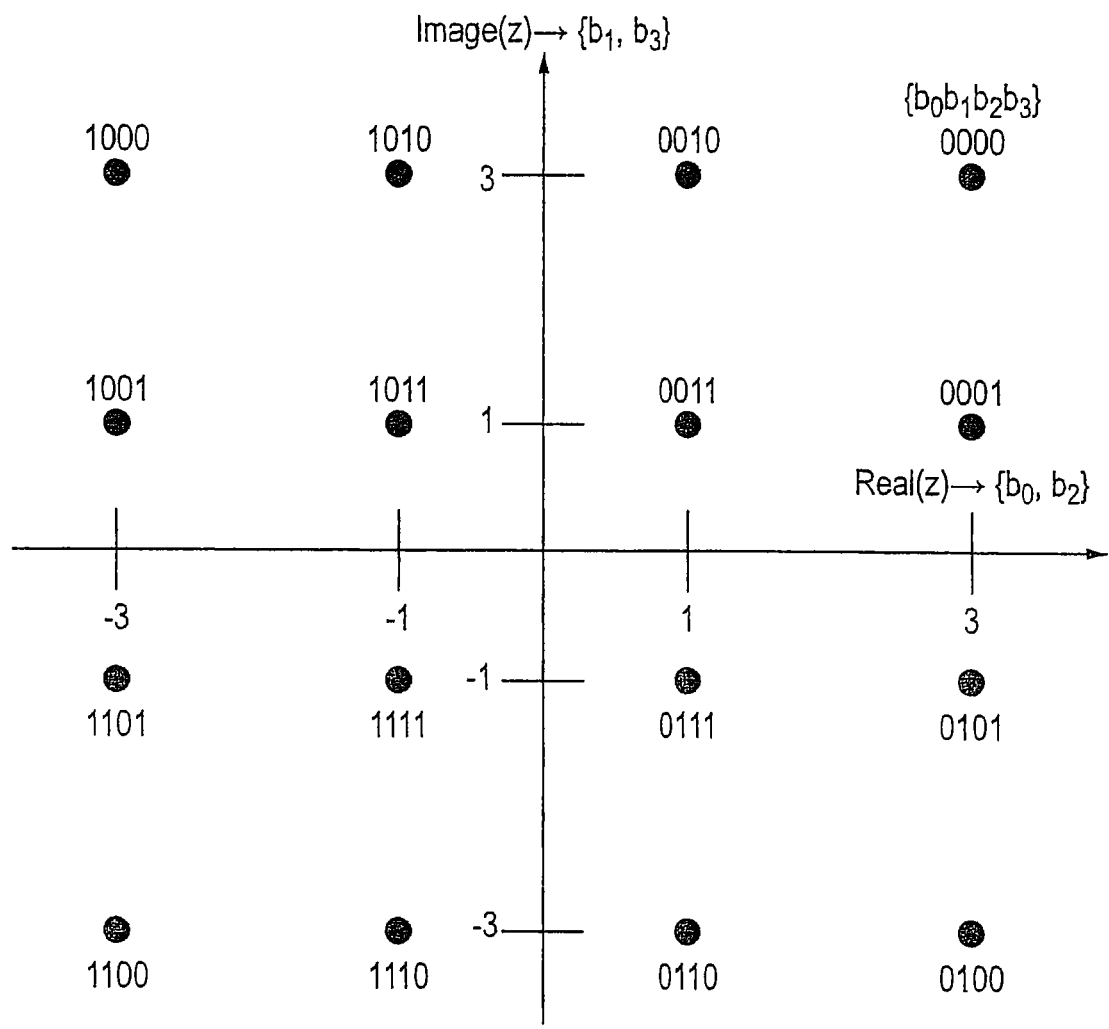
FIG. 28 is a schematic representation of a signal constellation diagram for 16 QAM showing an example mapping of data bits to modulation symbols.

As explained above in some example embodiments the estimate of the local signal D'(z) can be used to re-constitute the received signal with the effect that an improved estimate of the national signal S(z) can then be generated from that re-constituted signal. As illustrated for the second example of an OFDM detector 150 shown in FIG. 25, a second national equaliser/demapper 400 is used to generate this improved estimate of the national signal S(z). The second national equaliser/demapper 400 does not use a divide by zero calculation and bit slicing as is performed by the first national equaliser 292, but like the local equaliser/demapper 402, generates a log likelihood ratio for each modulation symbol or cell. As shown in FIG. 29, the second national equaliser/demapper includes a subtraction circuit 420, which receives on a first input and output from a multiplier 422. The multiplier then feds a national signal equaliser/de-mapper 424 which operates in a similar manner to the local equaliser/de-mapper 404 to calculate for each modulation symbol or OFDM cell a LLR.

In FIG. 29, the multiplier 422 receives the estimate of the local signal D'(z) on a connecting channel 406 from the local equaliser/demapper 402 and the estimate of the local channel H'l(z) on a connecting channel 408 and combines the two to form an estimate of the local signal as received from the local channel. This resulting signal is fed to the first input of the subtraction circuit 420, which receives on a second input the originally received signal R(z) from the FFT processor 290 as shown in FIG. 25. The output of the subtraction circuit 420 therefore forms S(z)H(z) according to the equation:

$$R(z) - D'(z)H_l'(z) = S(z)H(z)$$

As shown in FIG. 29 the national signal demapper 424 operates substantially as explained above for the local equaliser/de-mapper to generate a LLR value for each of the modulation symbols or cells of the received OFDM symbol for the national signal using H(z) received from the first national equaliser 292 as the channel transfer function to form a refined estimate of the national signal S"(z) at an output 160.

Summary of Operation

Figure 30:
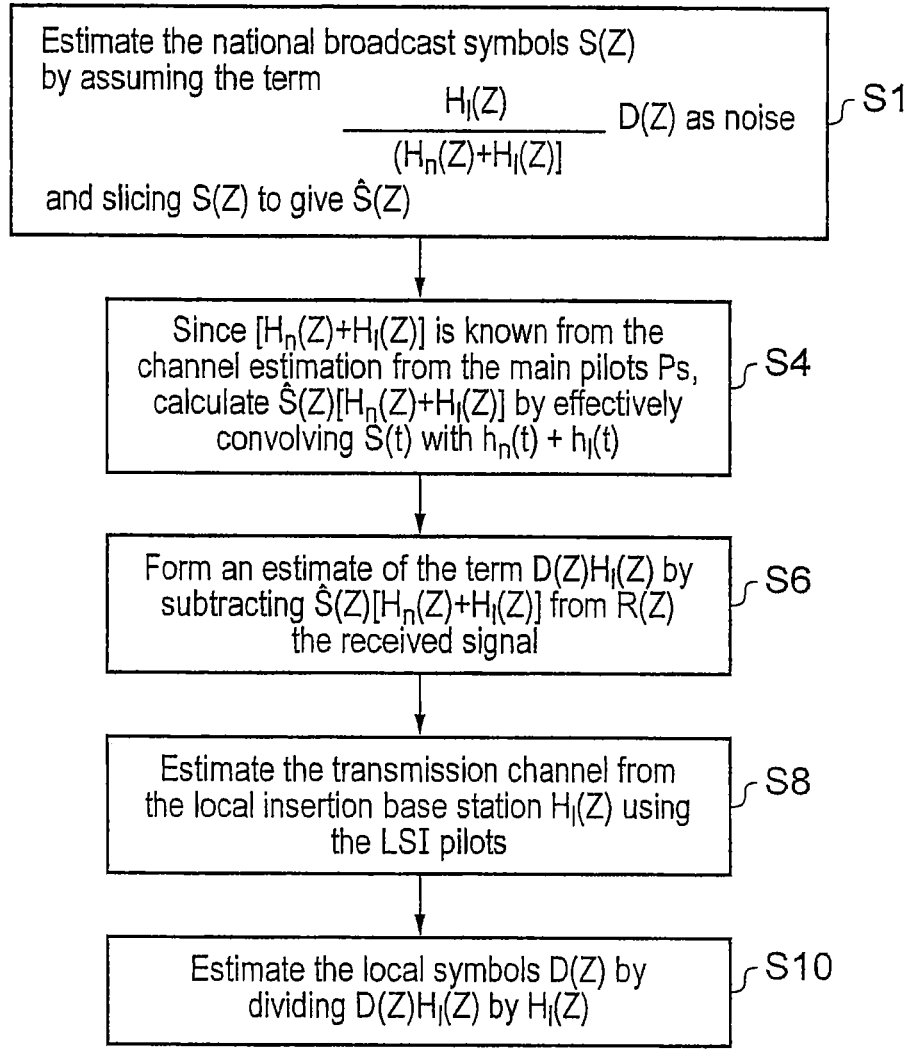
FIG. 30 is a flow diagram illustrating an example operation of a process required to equalise a single frequency signal which includes components from a first and a second modulation scheme.

In summary the operation of the receiver shown in FIGS. 24a and 25 to recover the local data from the local service insertion symbols is illustrated at a general level by a flow diagram shown in FIG. 30 which is summarised as follows:

S2: An estimate of the national broadcast symbols Ŝ(z) is formed by regarding the term $$\frac{H_l(z)}{[H_n(z) + H_l(z)]} D(z)$$

as noise and slicing the recovered signal about the real and imaginary plane to form an estimate of the national broadcast data.

S4: An estimate of the combined channel which is the transmitting channel from the nation broadcast base station and the local service insertion base station is formed using the main pilot sub-carriers Ps to calculate an estimate of a term representing the regenerated national broadcast signal convolved with the combined national broadcast and local service insertion channels Ŝ(z)[$H_n(z)+H_l(z)$].

S6: An estimate of the local service insertion symbols convolved with the local channel is formed by subtracting the generated term from step S4 from the received signal R(z)(D(z)$H_l(z)$≈R(z)−Ŝ(z)[$H_n(z)+H_l(z)$]).

S8: An estimate of the channel through which the local service insertion has passed from the base station to the receiver $\hat{H}_l(z)$ is determined using the local service insertion pilots.

S10: The local service insertion data is then estimated from the symbols produced by dividing the recovered term by the estimate of the local channel $$\tilde{D}(z) \approx \frac{R(z) - \hat{S}(z)[H_n(z) + H_l(z)]}{\hat{H}_l(z)}.$$

Various modifications may be made to the present invention described above without departing from the scope of the present invention as defined in the appended claims. For example, other modulation schemes could be used other than those described above, with appropriate adjustments being made to the receiver. Furthermore, the demodulation process can be iterated as described above for a number of times to improve the received symbol estimates. Furthermore, the receiver could be used in various systems, which utilise OFDM modulation other than those defined according to the DVB-NGH standards.

The invention claimed is:

1. A transmitter for communicating data using Orthogonal Frequency Division Multiplexed (OFDM) symbols, the OFDM symbols including a plurality of sub-carrier symbols formed in the frequency domain for modulating with the data to be carried and pilot sub-carriers, the transmitter comprising:

circuitry configured to
receive on a first input, national broadcast data symbols from a first data pipe according to a national broadcast channel for transmission,
receive on a second input, local service insertion data symbols from a local service insertion data pipe according to a local service channel for transmission, modulate the data bearing sub-carrier signals of the OFDM symbols with either the national broadcast data symbols or both the local service insertion data symbols and the national broadcast symbols, the modulation of the data bearing sub-carrier signals of the OFDM symbols with the national broadcast data symbols being performed by mapping the data symbols according to a first modulation scheme, and the modulation of the sub-carrier signals of the OFDM symbols with both the local service insertion data symbols and the national broadcast data symbols being performed by mapping the national broadcast data symbols and the local service insertion data symbols according to a second modulation scheme, modulate the pilot sub-carriers of the OFDM symbols with pilot symbols to form the OFDM symbols for transmission, and modulate a radio frequency carrier signal with the OFDM symbols for transmission, wherein the first modulation scheme is a lower order modulation scheme providing first modulation symbols with values from a smaller number of constellation points in a complex plane than the second modulation scheme, which is a higher order modulation scheme, wherein the second modulation scheme provides second modulation symbols with values which are disposed in the complex plane about corresponding values of the first modulation scheme, with an effect that detection of one of the second modulation symbols of the second modulation scheme provides the local service insertion data symbols and the national broadcast data symbols and allows detection of national broadcast modulation symbols from the first modulation scheme providing the national broadcast data symbols, in the presence of modulation symbols from the second modulation scheme, and wherein, when the modulated data bearing sub-carrier signals include both the local service insertion data symbols and the national broadcast symbols, local pilot symbols are included with the local service insertion data symbols.

2. The transmitter as claimed in claim 1, wherein the first modulation scheme is M-QAM and the second modulation scheme is 4M-QAM.

3. The transmitter as claimed in claim 1, wherein the local pilot symbols are inserted into the local service insertion data symbols by puncturing the local service insertion data symbols and by replacing the local service insertion data symbols with the local pilot symbols, which are modulated using the second modulation scheme.

4. The transmitter as claimed in claim 1, wherein the second modulation scheme provides two or more constellation points in the complex plane for each constellation point in the complex plane of the first modulation scheme.

5. The transmitter as claimed in claim 1, wherein the first modulation scheme is N-QAM and the second modulation second is M-QAM, where N<M and M/N is two or more.

6. The transmitter as claimed in claim 1, wherein the circuitry is configured to transmit data symbols of the OFDM symbols in accordance with a Next Generation Hand-held standard.

7. A method of transmitting data using Orthogonal Frequency Division Multiplexed (OFDM) symbols, the OFDM symbols including a plurality of sub-carrier symbols formed in the frequency domain for modulating with the data to be carried and pilot sub-carriers, the method comprising:

receiving at a first input of circuitry, national broadcast data symbols from a first data pipe according to a national broadcast channel for transmission, receiving at a second input of the circuitry, local service insertion data symbols from a local service insertion data pipe according to a local service channel for transmission, modulating, using the circuitry, the data bearing sub-carrier signals of the OFDM symbols with either the national broadcast data symbols or both the local service insertion data symbols and the national broadcast symbols, said modulating the data bearing sub-carrier signals of the OFDM symbols with the national broadcast data symbols being performed by mapping the data symbols according to a first modulation scheme, and said modulating the data bearing sub-carrier signals of the OFDM symbols with both the local service insertion data symbols and the national broadcast data symbols being performed by mapping the national broadcast data symbols and the local service insertion data symbols according to a second modulation scheme, and modulating, using the circuitry, the pilot sub-carriers of the OFDM symbols with pilot symbols to form the OFDM symbols for transmission, wherein the first modulation scheme is a lower order modulation scheme providing first modulation symbols with values from a smaller number of constellation points in a complex plane than the second modulation scheme, which is a higher order modulation scheme, wherein the second modulation scheme provides second modulation symbols with values which are disposed in the complex plane about corresponding values of the first modulation scheme, with an effect that detection of one of the second modulation symbols of the second modulation scheme provides the local insertion data symbols and the national broadcast data symbols and allows detection of national broadcast modulation symbols from the first modulation scheme providing the national broadcast data symbols, in the presence of modulation symbols from the second modulation scheme, and wherein, when the modulated data bearing sub-carrier signals include both the local service insertion data symbols and the national broadcast symbols, local pilot symbols are included with the local service insertion data symbols.

8. The method as claimed in claim 7, wherein the second modulation scheme provides two or more constellation points in the complex plane for each constellation point in the complex plane of the first modulation scheme.

* * * * *

UNITED STATES PATENT AND TRADEMARK OFFICE
CERTIFICATE OF CORRECTION

PATENT NO.        : 9,112,760 B2                                  Page 1 of 1
APPLICATION NO.   : 13/747531
DATED             : August 18, 2015
INVENTOR(S)       : Samuel Asangbeng Atungsiri et al.

It is certified that error appears in the above-identified patent and that said Letters Patent is hereby corrected as shown below:

On the title page, Item (30), the Foreign Application Priority Data Information is incorrect.
Item (30) should read:

--(30)   Foreign Application Priority Data

Oct. 18, 2010   (GB).............................1017566.9
Oct. 18, 2010   (GB).............................1017567.7
Oct. 18, 2010   (GB).............................1017565.1
Jan. 17, 2011   (GB).............................1100736.6--

Signed and Sealed this
Fifth Day of April, 2016

Michelle K. Lee
*Director of the United States Patent and Trademark Office*